US008428605B2

(12) United States Patent
Pedersen et al.

(10) Patent No.: US 8,428,605 B2
(45) Date of Patent: Apr. 23, 2013

(54) ADAPTIVE BROADBAND PLATFORMS AND METHODS OF OPERATION

(75) Inventors: Erling J Pedersen, Coral Springs, FL (US); Roc A Lastinger, Cave Creek, AZ (US)

(73) Assignee: Innovative Wireless Sweden AB, Vaxjo (SE)

( * ) Notice: Subject to any disclaimer, the term of this patent is extended or adjusted under 35 U.S.C. 154(b) by 1063 days.

(21) Appl. No.: 10/533,696

(22) PCT Filed: Nov. 7, 2003
(Under 37 CFR 1.47)

(86) PCT No.: PCT/US03/36077
§ 371 (c)(1),
(2), (4) Date: Aug. 25, 2006

(87) PCT Pub. No.: WO2004/045087
PCT Pub. Date: May 27, 2004

(65) Prior Publication Data
US 2007/0082674 A1    Apr. 12, 2007

Related U.S. Application Data

(63) Continuation-in-part of application No. 10/269,115, filed on Oct. 7, 2002.

(60) Provisional application No. 60/328,909, filed on Oct. 11, 2001, provisional application No. 60/425,016, filed on Nov. 8, 2002.

(51) Int. Cl.
*H04W 72/00* (2009.01)

(52) U.S. Cl.
USPC .......................................................... 455/450

(58) Field of Classification Search .................. 455/450, 455/443, 444, 446, 447, 448, 449, 452.1, 455/452.2, 452.3
See application file for complete search history.

(56) References Cited

U.S. PATENT DOCUMENTS

| | | | |
|---|---|---|---|
| 5,252,979 A | 10/1993 | Nysen | |
| 5,448,753 A * | 9/1995 | Ahl et al. | 455/422.1 |
| 5,657,374 A | 8/1997 | Russell | |
| 5,850,608 A | 12/1998 | Faruque | |
| 5,914,946 A * | 6/1999 | Avidor et al. | 370/336 |
| 5,924,037 A | 7/1999 | Mao | |
| 5,974,323 A | 10/1999 | Doner | |
| 5,974,324 A | 10/1999 | Henson | |
| 5,999,525 A | 12/1999 | Krishnaswamy | |
| 6,047,186 A | 4/2000 | Yu | |
| 6,212,385 B1 | 4/2001 | Thomas | |
| 6,335,927 B1 | 1/2002 | Elliott | |
| 6,400,697 B1 * | 6/2002 | Leung et al. | 370/328 |
| 6,405,044 B1 * | 6/2002 | Smith et al. | 455/447 |

(Continued)

*Primary Examiner* — Yuwen Pan
*Assistant Examiner* — Ankur Jain
(74) *Attorney, Agent, or Firm* — William R Bachand

(57) ABSTRACT

A subscriber platform for broadband communication, according to various aspects of the present invention, includes an antenna, a plurality of transceivers, and a processor. The antenna supports communication via a plurality of directional beams. The plurality of frequency agile transceivers operate simultaneously, each transceiver being coupled to the antenna for communication via a respective directional beam. The processor is coupled to the plurality of transceivers. And, the transceivers are coupled to the antenna to communicate data among the directional beams as directed by the processor, communication including directional diversity and frequency diversity.

15 Claims, 21 Drawing Sheets

U.S. PATENT DOCUMENTS

| | | | |
|---|---|---|---|
| 6,415,162 B1 * | 7/2002 | Dent | 455/562.1 |
| 6,470,183 B1 | 10/2002 | Herrig | |
| 6,470,195 B1 * | 10/2002 | Meyer | 455/562.1 |
| 6,473,616 B1 * | 10/2002 | Sydor | 455/446 |
| 6,615,047 B1 | 9/2003 | Yasooka | |
| 6,628,707 B2 | 9/2003 | Rafie | |
| 6,748,218 B1 * | 6/2004 | Johnson et al. | 455/446 |
| 6,804,521 B2 * | 10/2004 | Tong et al. | 455/450 |
| 6,816,115 B1 | 11/2004 | Redi | |
| 6,816,460 B1 | 11/2004 | Ahmed | |
| 6,850,502 B1 | 2/2005 | Kagan | |
| 6,870,816 B1 | 3/2005 | Edwards | |
| 6,876,643 B1 | 4/2005 | Aggarwal | |
| 6,904,364 B2 | 6/2005 | Randazzo | |
| 6,907,246 B2 * | 6/2005 | Xu et al. | 455/447 |
| 6,912,204 B2 | 6/2005 | Kossi | |
| 6,980,524 B1 | 12/2005 | Lu | |
| 7,031,293 B1 * | 4/2006 | Srikrishna et al. | 370/348 |
| 7,031,321 B2 | 4/2006 | Habetha | |
| 7,031,754 B2 * | 4/2006 | Scherzer et al. | 455/562.1 |
| 7,058,050 B2 | 6/2006 | Johansson | |
| 7,069,483 B2 | 6/2006 | Gillies | |
| 7,079,552 B2 * | 7/2006 | Cain et al. | 370/469 |
| 7,079,574 B2 | 7/2006 | Rafie | |
| 7,142,523 B1 * | 11/2006 | Chekuri et al. | 370/328 |
| 7,203,520 B2 * | 4/2007 | Senarath et al. | 455/562.1 |
| 7,844,698 B2 * | 11/2010 | Aoyama et al. | 709/224 |
| 2002/0027894 A1 | 3/2002 | Arrakoski | |
| 2002/0176390 A1 | 11/2002 | Sparr | |
| 2002/0181427 A1 | 12/2002 | Sparr | |
| 2006/0031477 A1 | 2/2006 | Ayyagari | |

* cited by examiner

ADAPTIVE BROADBAND PLATFORMS AND METHODS OF OPERATION

CROSS REFERENCE TO RELATED APPLICATIONS

This application is a continuation in part of and claims priority to pending U.S. patent application Ser. No. 10/269,115 by Erling J. Pedersen filed Oct. 7, 2002 that claims priority to U.S. Provisional Patent Application Ser. No. 60/328,909 by Erling J. Pedersen filed Oct. 11, 2001, incorporated herein by this reference; and claims priority to U.S. Provisional Patent Application Ser. No. 60/425,016 by Erling J. Pedersen and Roc A. Lastinger, filed Nov. 8, 2002.

FIELD OF THE INVENTION

Embodiments of the present invention relate to broadband communication and to platforms, networks, and methods using broadband communication.

BACKGROUND OF THE INVENTION

Broadband communication is the most sought after commodity in today's communication market. Bundling of services has become the ultimate desire of all users in today's market. Over the past many years, new technologies have emerged in the field of communication, where the invention of the Internet is one of the most prominent advancement in modern history. Because of its popularity, the Internet has become congested, operating at capacity, and is in desperate need of additional bandwidth to accommodate even more users wanting to take advantage of the new advances in the field of communication.

Fiber-optic cable systems have been hailed as the ultimate broadband solution, but cost prohibitive constraints and other factors that limit application of fiber optic cable systems for data transport to all homes have curbed the spread of this technology. Operators have been looking for a "last mile" solution (e.g., a communication technology for subscribers that are more or less a mile from the end of a wired network) to bring their communication products directly to the consumers. Fiber optic cable systems turned out to be only a partial answer to a complex problem.

Satellite systems have been used unsuccessfully to provide connectivity anywhere and anytime. Lack of sufficient bandwidth has been the main reason that prevented the satellite entrepreneur's success in the past.

What is needed for delivery of bundled services is a communication technology having a backbone with relatively large bandwidth compared with conventional systems. Bundled services would include telecommunication traffic (fixed and mobile), Internet traffic, distant personal information computing, and interactive multimedia services (e.g., television, video on demand, and pay-per-view). Bundled services would be delivered to all users no matter where they were located.

It has been clear to the industry for a long time that the existing backbone is not adequate for expected future demand. A new and better backbone is desired over patching the old one. So far, attempts to find a broadband delivery technology for bundled services have not been entirely successful. Conventional systems have provided bundled services for a couple of modalities, but bandwidth is not sufficient for growth.

Without platforms, networks, and methods of the present invention, the current demand for increased bandwidth will not be economically met. Bandwidth is a colloquial expression for the data rate into or out of subscriber equipment. A typical video presentation may require a continuous stream of 5 Megabits per second (Mbps). If a network can support 10 Mbps, then two users desiring a video presentation could share the network but would consume the entire bandwidth of the network. If a third user began consuming data at a rate of 3 Mbps, there could be a noticeable degradation of the quality of service provided by the network (e.g., original users see slcips in video presentations).

SUMMARY OF THE INVENTION

A subscriber platform for broadband communication, according to various aspects of the present invention, includes an antenna, a plurality of transceivers, and a processor. The antenna supports communication via a plurality of directional beams. The plurality of frequency agile transceivers operate simultaneously, each transceiver being coupled to the antenna for communication via a respective directional beam. The processor is coupled to the plurality of transceivers. And, the transceivers are coupled to the antenna to communicate data among the directional beams as directed by the processor, communication including directional diversity and frequency diversity.

A subscriber platform for broadband communication, according to various aspects of the present invention, includes an antenna, a plurality of transceivers, and a processor. The antenna supports communication via a plurality of directional beams. The plurality of transceivers operate simultaneously, each transceiver being coupled to the antenna for communication via a respective directional beam. The processor is coupled to the plurality of transceivers. The processor includes an interface for communicating with provided storage and display devices that are local to the platform. And, the transceivers are coupled to the interface and to the antenna to communicate data among the directional beams and the provided devices as directed by the processor.

A method, according to various aspects of the present invention, for increasing throughput to a particular subscriber of a provided network of subscriber platforms includes the following steps in any order: (a) automatically recognizing that communication routes employing an added subscriber platform are available; and (b) automatically routing increased throughput for the particular subscriber via the added subscriber platform.

A method, according to various aspects of the present invention, for increasing data communication to a particular subscriber of a provided network of subscriber platforms, the particular subscriber consuming data from a first source via a first route through the network, includes the following steps in any order: (a) automatically recognizing that communication routes employing an added subscriber platform are available, the added subscriber platform having a second source of data; and (b) automatically routing data from the second source to the particular subscriber via a second route that is independent of the first route.

A regional communication platform for broadband communication, according to various aspects of the present invention, includes an antenna, a plurality of transceivers, and a processor. The antenna is for communication via a plurality of directional beams. The plurality of transceivers operate simultaneously, each transceiver being coupled to the antenna for communication via a respective directional beam. The processor is coupled to the antenna and to the plurality of transceivers. The transceivers are coupled to the antenna to communicate data among the directional beams as directed by the processor using directional diversity and frequency diversity. The first beam of the plurality is for communication with a provided subscriber platform in a first direction at a first frequency. And, a second beam of the plurality is for communication with a provided second regional communication platform in the same direction as the first direction at a second frequency different from the first frequency.

A regional communication platform for broadband communication, according to various aspects of the present invention, includes an antenna, a plurality of transceivers, and a processor. The antenna is for communication via a plurality of directional beams. The plurality of transceivers operate simultaneously, each transceiver coupled to the antenna for communication via a respective directional beam. The processor is coupled to the antenna and to the plurality of transceivers. The transceivers are coupled to the antenna to communicate data among the directional beams as directed by the processor using directional diversity and frequency diversity. And, the processor routes data to a selected destination being selected from at least one of a provided subscriber platform of a provided network of subscriber platforms, a provided second regional communication platform, and a network different from the provided network of subscriber platforms.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
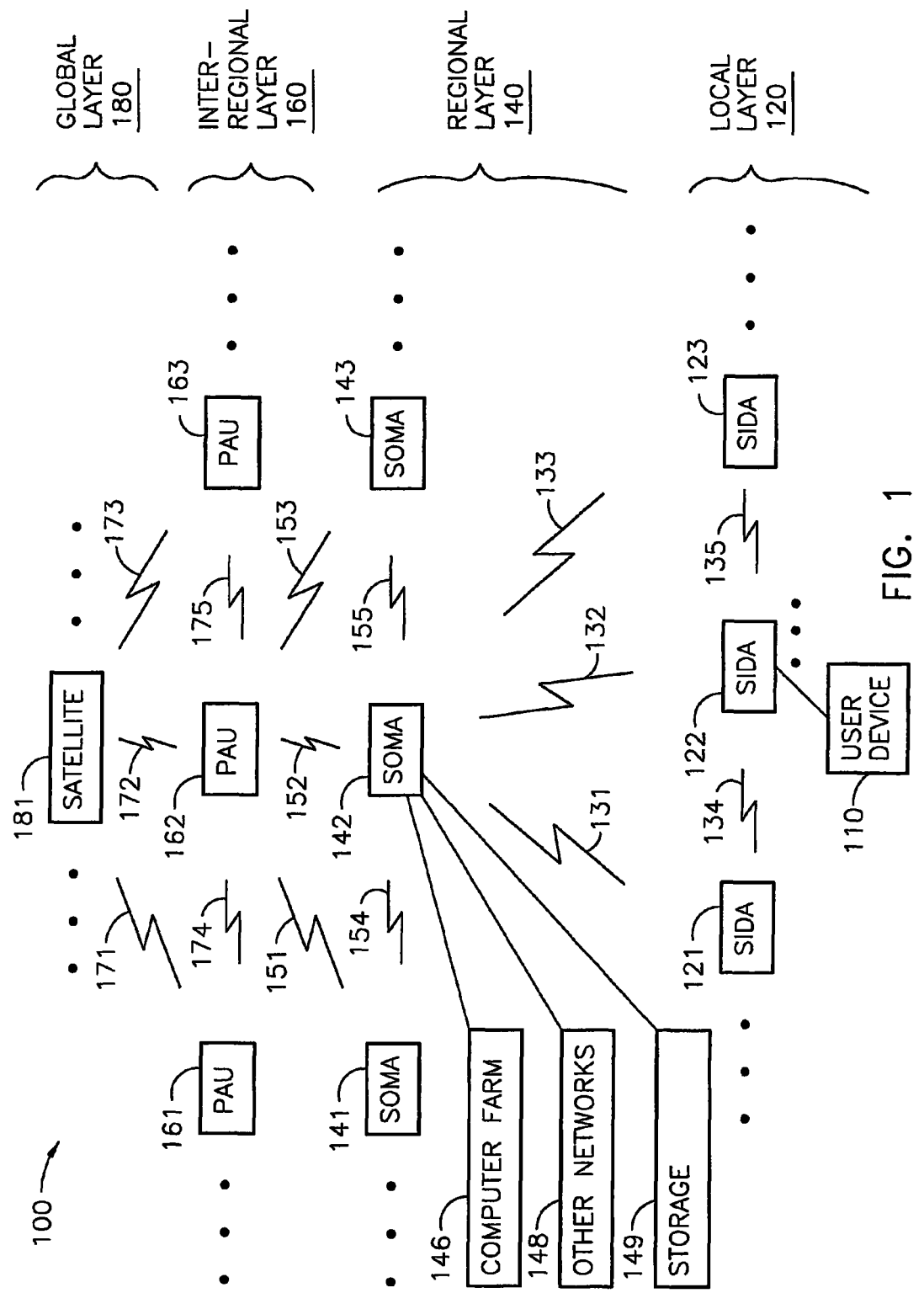
FIG. 1 is a functional block diagram of a broadband communication network according to various aspects of the present invention.

A wireless interactive super broadband communication network (hereinafter a "WISB" network), according to various aspects of the present invention, includes interactive communications platforms. A bandwidth in excess of 1 Gigabit per second (Gbps) for user devices is hereafter referred to as "super broadband". Super broadband applies to any mix of fixed wireless access ("FWA") and mobile wireless access ("MWA") applications. Such a wireless interactive super broadband communication network includes a distributed infrastructure typically having: (1) a plurality of platforms hereinafter called SIDA platforms; (2) a plurality of platforms hereinafter called SOMA platforms; and (3) a plurality of platforms hereinafter called PAU platforms.

A SIDA platform (named after the small, interactive, directional antennas that are part of a SIDA platform) includes an antenna unit and a transceiver unit. Each transceiver is preferably a low cost, low power, electromagnetic transceiver. A SIDA platform (also called a SIDA cell) may be implemented as a cell having the antenna unit mounted on the roof of a building. Each antenna unit includes a random angle beamforming antenna network (e.g., a phased array of antenna elements). The antenna network (a circuit) may have 16, 32, or 64 beamformers.

A SOMA platform (named for a part of a neuron) may be implemented as a regional tower mounted platform with transceivers for coordinating communication within clusters of SIDA platforms. A SOMA platform is also called a SOMA tower.

A PAU platform (standing for the Purkinjie antenna unit, Purkinjie being the name for a particular neuron) provides a longer range transceiver unit for conveying signals over large distances via troposcatter, fiber optic, and/or low earth orbit satellite systems (LEOS).

A WISB network provides automated full duplex routing of messages. A WISB network provides super broadband intercommunication between subscribers. The WISB network is expandable to alleviate "bottlenecks" or network traffic congestion. Traffic in a WISB network may be multipoint to multipoint, point to multipoint, or point to point. The WISB network may be implemented with conventional protocols for link management, multi-hop routing and multicasting, remote network management, and network security.

A WISB network generally operates in multiple layers. Each layer may use channels of high frequency radio communication bands, such as between 2.4 GHz to 30 GHz. An initial commercial embodiment of a WISB network was designed for the unlicensed 5.8 GHz frequency band.

Because each user (e.g., a SIDA platform) can communicate on simultaneous independent channels by frequency and directional diversity, a WISB network may provide 256 Mbps of bandwidth per individual user. For example, operating at 5.8 GHz, a WISB network may provide between 3.8 Gbps to 12.8 Gbps of bandwidth to particular users.

The WISB network may be implemented with digital transceiver systems and operating protocols for preventing interference of signals on a single frequency and eliminating crossover signals. Platforms having directional antenna beams facing each other may use them to communicate or may avoid communication by using frequency diversity. Networks according to various aspects of the present invention may accommodate a large number of users (e.g., thirty-four times the number of users compared to conventional networks) by facilitating a multiplicity of users on a single frequency (frequency diversity).

Each SIDA platform of a WISB network may include a home gateway controller. A home gateway controller may be implemented using a conventional operating system and a television screen (or other monitor as the primary display). The home gateway controller may operate as an alternative personal computer; and, due to the abundance of available bandwidth, may use remote computer farms (e.g., personal information (PI) computing) to process and store information requiring large capacity processing and storage. WISB network platform operating software enables personal computers to be hooked up to a WISB network through a software/hardware interface. A home gateway controller may have a secure video-on-demand module that operates as an alternative "video rental store", making electronically accessed global film and music libraries available. A home gateway controller may incorporate a financial card swipe capability making it possible to purchase video on demand and other Internet services directly from the home through secure "Wallet Banking" software.

Any platform (e.g., a SIDA platform) of the present invention may be implemented with integrated circuits, processors, and miniaturized transceivers to operate within a handheld device.

A WISB network may include a low earth orbit ("LEO") space segment that provides a communications-bridge for the terrestrial portions of the WISB network via PAU platforms. A WISB network LEO space segment may provide a super broadband orbital platform for commercial aviation. Airplane manufacturers can implement any mix of platforms in aircraft. In such an embodiment, the aircraft communicates with a WISB network space segment, which in turn communicates with a WISB network terrestrial segment. Passengers (e.g., users of SIDA platforms) may enjoy a plethora of interactive communication services including in flight telephony, video conferencing, video on demand, music on demand, and video games. In addition, data that is normally recorded and stored on a "black box" (e.g., a flight recorder) onboard the aircraft may be electronically transmitted to earth-based data storage facilities using WISB network components. The amount of data that can be recorded is increased and the disadvantages associated with onboard flight recorders are eliminated.

Security may be enhanced on aircraft via onboard high definition cameras, which would be able to transmit clear images and sound in real time via a platform to platform space-terestrial pathway. Each airplane seat could be monitored effectively through the system prior to takeoff or during flight. Additionally, the comparatively large bandwidth available in a WISB network enables the utilization of face recognition software for early detection of terrorists, highjackers, or other high-risk individuals onboard. Using a WISB network, early detection of unwanted individuals is possible using a high-definition camera, which may be installed at a airport terminal, gate, and/or check-in counter. Such a camera may obtain and transmit digital images to a face-recognition processor in an airport security unit for analysis and comparison with facial recognition data maintained in a global database of known terrorists. Due to the vast amount of data required for face recognition processing, super broadband may be desirable for transmitting the best possible details of an individual's face and to produce a result equal to or better than a fingerprint of the individual.

A network, according to various aspects of the present invention facilitates communication among and between four layers: a local layer, a regional layer, an inter-regional layer, and a global layer. Message routing is preferably accomplished within one layer (e.g., the local layer), but may also include traffic between layers. For example, network 100 of FIGS. 1-13 includes local layer 120, regional layer 140, inter-regional layer 160, and global layer 180.

Local layer 120 includes any number of SIDA platforms (e.g., 121-123) which may be fixed or mobile. Each SIDA platform 122 may communicate via a wireless link 134 (135) with any other SIDA platform 121 (123) within range. Each SIDA platform may have zero or more user devices 110 (e.g., output devices such as displays, input devices such as a keyboard, storage devices such as tapes and disks, processing devices such as personal computers, and combinations of the above). Each SIDA platform 121-123 may communicate via a wireless link 131-133 with zero or more SOMA platforms 142 of the regional layer.

Regional layer 140 includes any number of SOMA platforms (e.g., 141-143). Typically, a SOMA platform 142 (e.g., a tower mounted platform) is located centrally in a region occupied by any number of SIDA platforms 121-123. Each SOMA platform 142 may communicate via a wireless link 154 (155) with any other SOMA platform within range. Each SOMA platform 142 controls zero or more computers or servers 146 (e.g., a personal information computer farm) and controls access to other networks 148 (e.g., the Internet). Each SOMA platform 142 may communicate via a wireless link 151-153 with zero or more PAU platforms 162 of the inter-regional layer.

Inter-regional layer 160 includes any number of PAU platforms (e.g., 161-163). Typically, a PAU platform 162 (e.g., a tower mounted platform) is located within range of several SOMA platforms 141-143. Each PAU platform 162 may communicate via a wireless link 174 (175) with any other PAU platform within range. Each SOMA platform 142 may communicate via a wireless link 171-173 with zero or more satellite platforms 181 of the global layer 180 or via troposcatter.

A platform generally includes a processor, a transceiver unit having any number of transceivers (e.g., 6), and an antenna unit having a corresponding number of antenna arrays (e.g., 6). For example, platform 200 of FIG. 2 includes processor 202, transceiver unit 204, and antenna unit 206. Processor 202 includes a box office controller 210, gateway controller 212, and user device interface 214. User interface 214 provides ports 215 for cable connections to devices local to the platform. For example, devices may perform display (e.g., output) or storage functions. Display devices 216 include TV, stereo, printer, and FAX machine. Storage devices include DVD, VCR, and PC. Transceiver unit 204 includes any number of frequency agile transceivers 232 and may include a fiber optic transceiver 234 for each trunk 236. Processor 202 directs transceivers of transceiver unit 204 via line 203 to implement frequency agility. Processor 202 may direct beamforming by any antenna array (e.g., 242 or 244) via line 205. In an alternate antenna unit, beams are preset and control by processor 202 is omitted.

Figure 2:
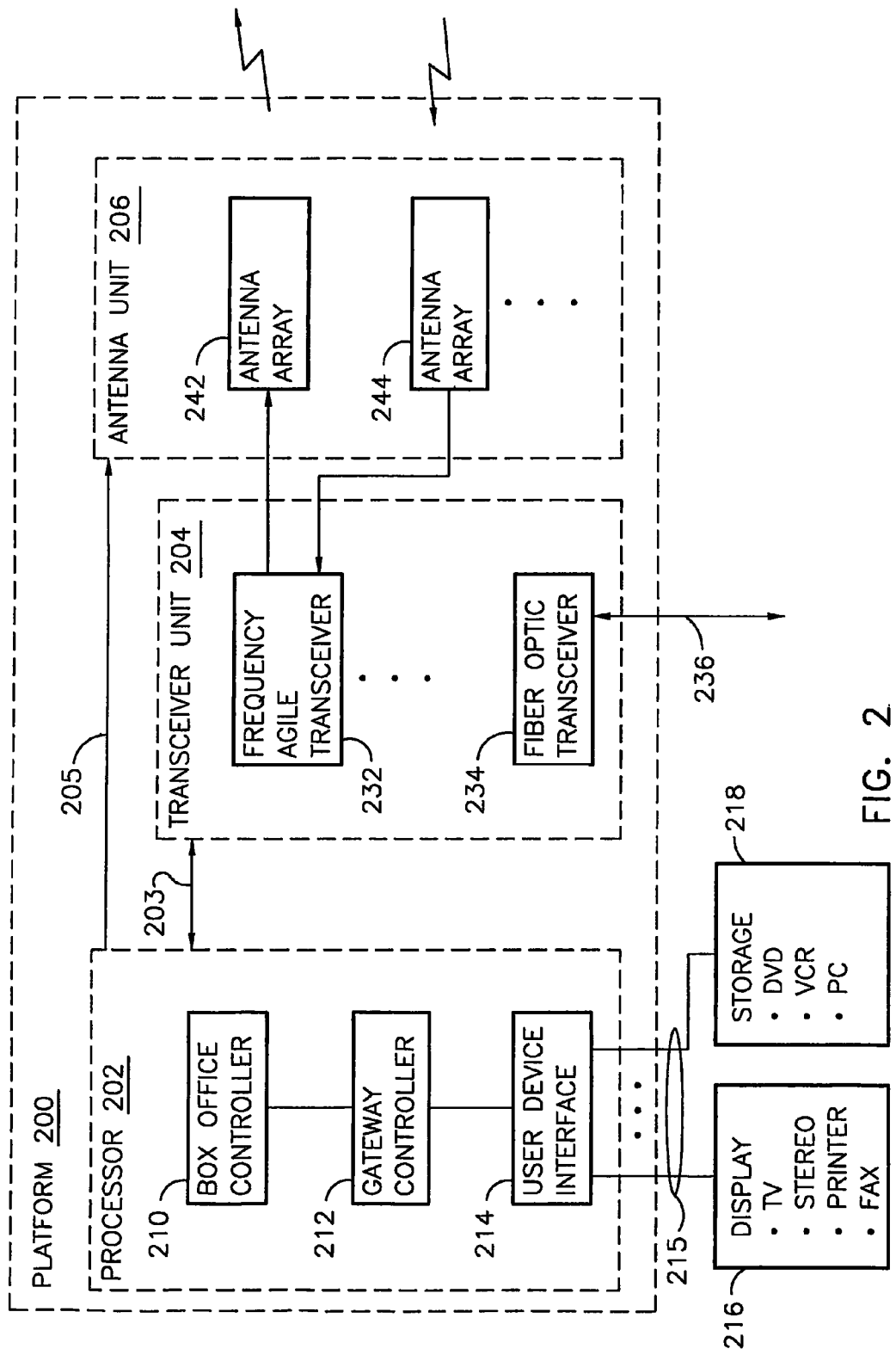
FIG. 2 is a functional block diagram of a platform used in the network of FIG. 1.
Figure 3:
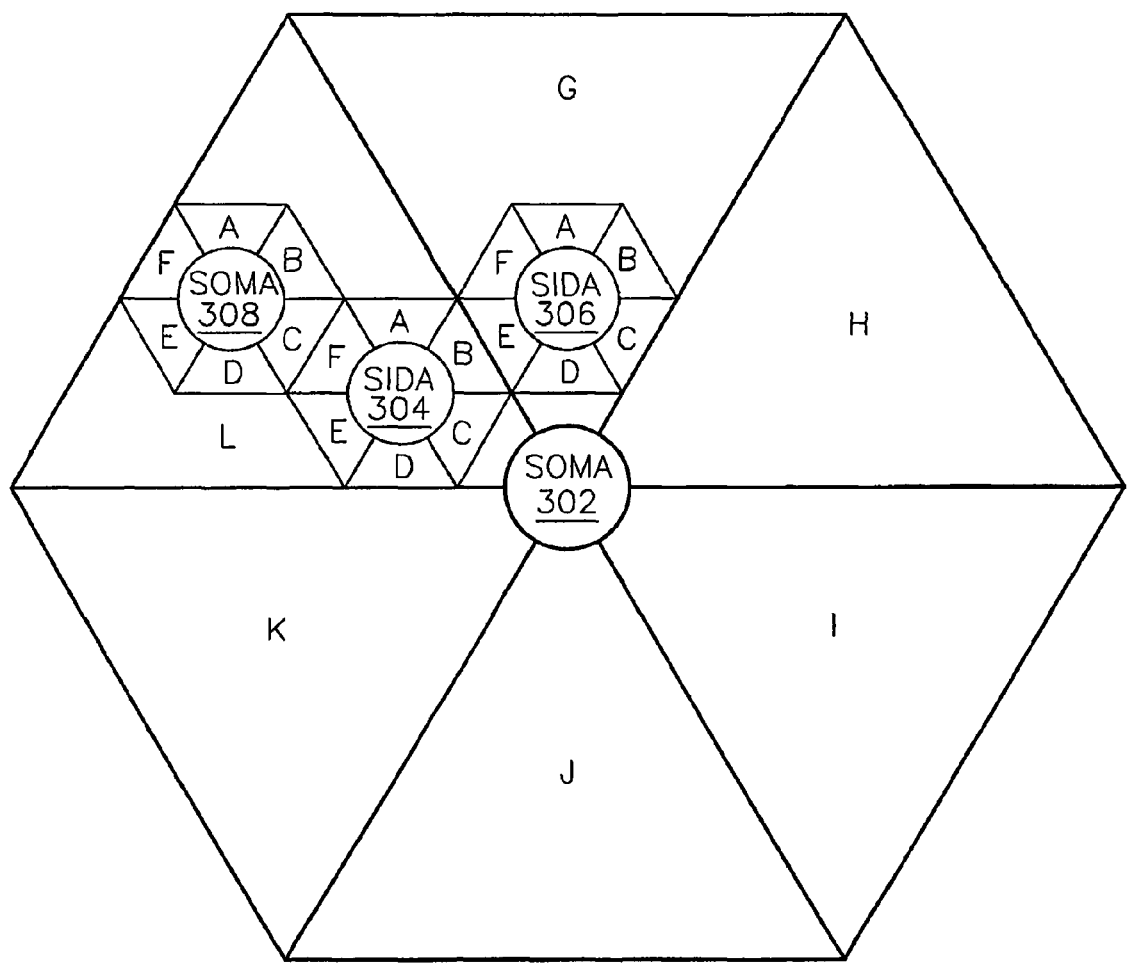
FIG. 3 is a diagram of overlapping areas of communication coverage for a portion of the system of FIG. 1.

FIG. 2 provides a schematic representation of a platform (e.g., a SIDA, SOMA, or PAU platform) according to various aspects of the present invention. The SIDA platform includes a processor, transceiver unit, and antenna unit. The antenna unit includes a small, full duplex, electronically interactive, directional, high gain, random angle phased array. The transceiver unit includes an RF modulator, low power supply, microwave unit, and remote on/off control switch. The antenna unit of a SIDA platform is preferably installed on a user's rooftop or other high, unobstructed location. SIDA platforms may be spaced at distances ranging between a few meters up to about 5 Km. A SIDA platform provides the communication gateway to a user's home for mobile and fixed wireless communications, digital TV reception, digital 3D interactive TV, video on demand in digital format (e.g., DVD quality), digital radio broadcast, and continuous high speed Internet connection. A SIDA platform differs from SOMA and PAU platforms by including (1) a user device interface (e.g., ports) for connecting the platform to a TV, VCR, DVD, Stereo, personal computer (PC), Fax machine, and/or a printer/scanner; (2) including a home gateway box office controller unit; and (3) omitting a fiber optic transceiver.

A SOMA platform, according to various aspects of the present invention, provides longer range (than a SIDA) communication and provides coordination of SIDA communications. The SOMA platform may include a fiber optic transceiver for communication on trunc lines to other SOMA and/or PAU platforms. SOMA platforms are generally located inside "clusters" or "conglomerates" of SIDA platforms (i.e., service regions), and may have coordinating responsibility for an area of up to a 60 Km radius. Each SOMA platform may be connected to other SOMA platforms via fiber-optic trunk lines. A SOMA platform may further include a high speed media access control (MAC) level router with a connection gateway to other networks (e.g., the Internet and World Wide Web).

The processor of a WISB platform (e.g., a MAC level routing system) integrates a number of protocols including channel access protocol, neighbor platform link management protocol, wireless multi-hop routing and multi-cast protocol, remote network management protocol, and network security protocol.

The channel access protocol governs: (a) scheduling of transmissions, (b) spectrum reuse (frequency agility), and (c) avoidance of collisions of message packets. Algorithms implementing such a protocol may include the following functions: (1) independent scheduling of network management message packets, (2) negotiated scheduling between platforms for a single RF channel multiple user facility of non-interfering data transmission between pairs of platforms, and (3) frequency agility, coding, and power control.

The neighbor platform link management protocol governs: (a) efficient platform to platform message packet delivery, (b) automatic adaptation to changes in platform configuration, availability (e.g., becoming available for communication due to movement, installation, or power applied), and quality in real time routing decisions based on current overall local network status (including transmitting and receiving with a platform of a different type: SIDA/SOMA, SOMA/PAU), (c) automatic synchronization algorithm for the network, and (d) error control coding rates between SIDA platforms, SOMA platforms, and PAU platforms related to: (1) SIDA to SIDA links, (2) SIDA to SOMA links (3) SOMA to SOMA links, (4) SOMA to PAU links, (5) PAU to PAU links via troposcatter (synchronized with the PAU remote network management protocol), and (6) PAU to PAU links via satellite (synchronized with the PAU remote network management protocol).

The wireless multi-hop routing and multicast protocol governs: (a) reliability in delivery of message packets, (b) efficient multicast mechanisms over wireless broadcast channels, and (c) dynamic ad-hoc network creation (e.g., finding available unused communications capability along the shortest path to the destination for efficient use of the spectrum).

The remote network management protocol governs the automatic distribution and upgrades of operating software to SIDA, SOMA, PAU and satellite platforms, home gateway controllers, and PI computer farms using a dynamic graphical user interface (GUI).

The network security protocol governs: (a) hopping patterns from SIDA to SIDA, SIDA to SOMA, SOMA to SOMA, and PAU to PAU via troposcatter or satellites, (b) automatic authentication of SIDA platforms upon (1) addition of a platform and (2) deletion of a platform, and (c) intrusion protection and packet filtering (e.g., by dynamic control of the RF waveform to prevent eavesdropping).

A computer farm may be attached to a SOMA or PAU platform. The computer farm facilitates broadband computing using the home gateway controller processor of a SIDA platform for access to the remote PI computer farm. Computers of the farm process and store information requiring heavy processing. The TV screen of a SIDA platform may be used as the visual media and a home gateway controller keyboard of the SIDA platform may be used to perform physical entries.

The SIDA and SOMA platform transceivers provide the interconnecting and coordinating functions for mobile and fixed wireless communications for distribution to SIDA platforms anywhere in the WISB network, mobile units inside of the SOMA communications conglomerate, and resources on outside networks through conventional switching and routing stations. SOMA platforms interconnect via existing fiber-optic trunk lines during the build-out phases, until within communication range of a neighboring SOMA platform, at which point the fiber-optic trunk line may serve as a redundant structure, not essential for network communication. SOMA platforms may communicate with PAUs via existing fiber-optic trunk lines during the build-out phase, until within communication range of a neighboring SOMA platform, at which point the fiber-optic trunk line may serve as a redundant structure, not essential for network communication.

The SOMA platforms provide the coordinating basis for digital telecommunication (FWA and MWA), Digital TV reception, digital 3D interactive TV, digital video on demand, digital radio broadcast, and for continuous high speed Internet connection, distributed through the SIDA platforms.

A PAU platform, according to various aspects of the present invention, provides longer range (than a SOMA) communication and provides conveyance of communication to SOMA platforms, to other PAUs, and to other networks. A PAU platform has a range of up to 1,000 Km using the troposphere as a mirror to bounce the signals ("troposcatter") from one PAU platform to the next. The PAU platform communicates globally via multi-hops from PAU tower to PAU tower.

The processor of a PAU platform performs protocols analogous to those discussed above, for example, where a SOMA processor coordinates SIDA platform communication, a PAU processor coordinates SOMA platform communication.

SIDA and SOMA platform communication ranges overlap when a SOMA platform is centrally located amid SIDA platforms. For example, SOMA platform 302 of FIG. 3 has six communication sectors A-F used for SOMA to SIDA communication and six communication sectors G-L used for SOMA to SOMA communication. To facilitate independent communication, frequencies selected for overlapping sectors are different. For example, a frequency used for sector G is different from any frequency used in sectors A-F of SIDA 306; and a frequency used for sector L is different from any frequency used in sectors A-F of SIDA 304 and SOMA 308. SOMA to SIDA communication may be facilitated by operation of a SOMA 308 with sectors, frequencies, and range similar or identical to SIDA to SIDA communication. For clarity SOMA 308 is shown with SIDA style frequency, sector, and range allocations. SOMA 308 communicates with SOMA 302 using SOMA style frequency, sector, and range allocations not shown. Many channels of SIDA to SIDA communication may therefore be simultaneous with SOMA to SOMA communication in one SOMA size sector.

Figure 4:
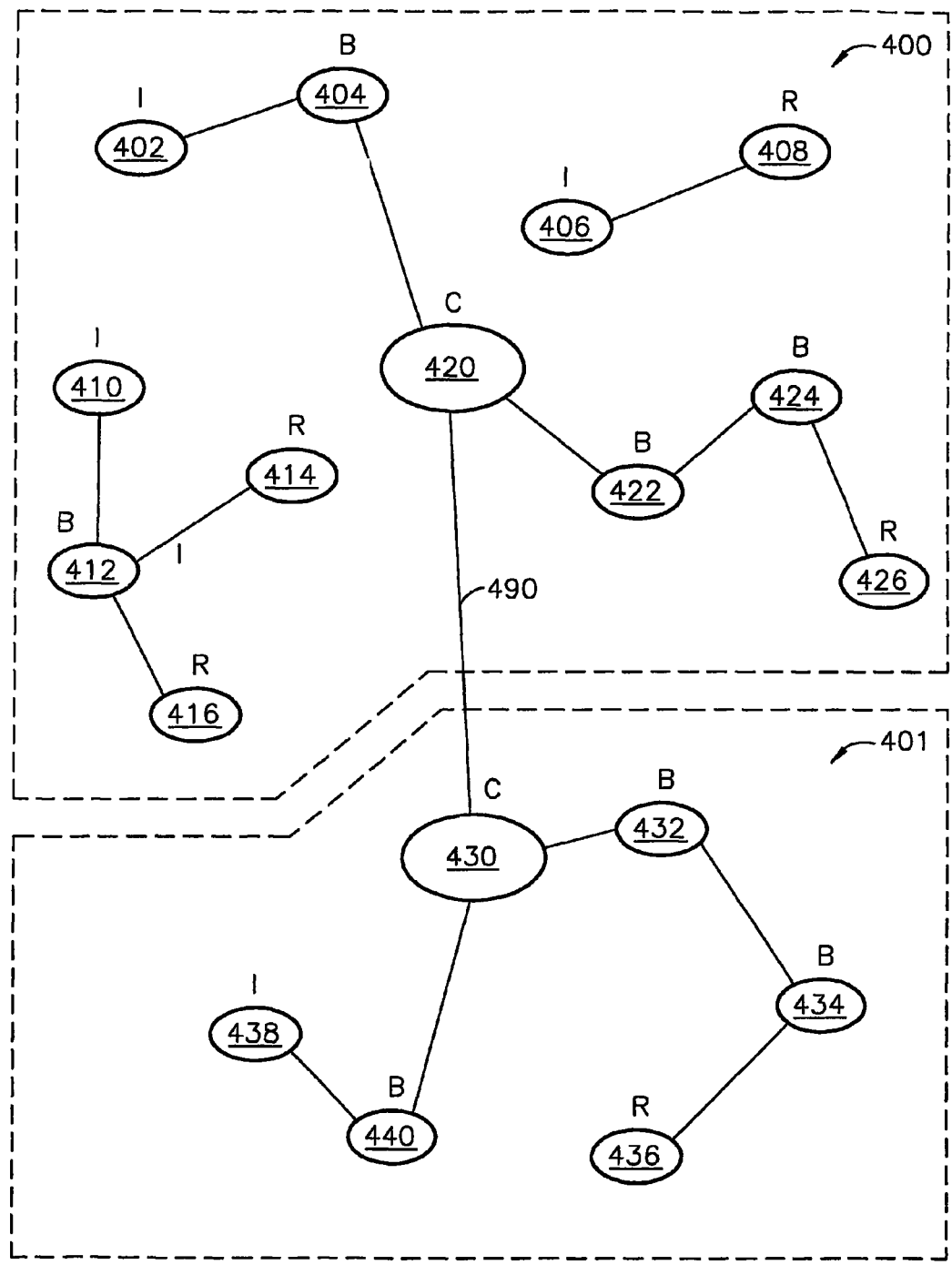
FIG. 4 is a diagram of communication routes in a portion of the system of FIG. 1.
Figure 5:
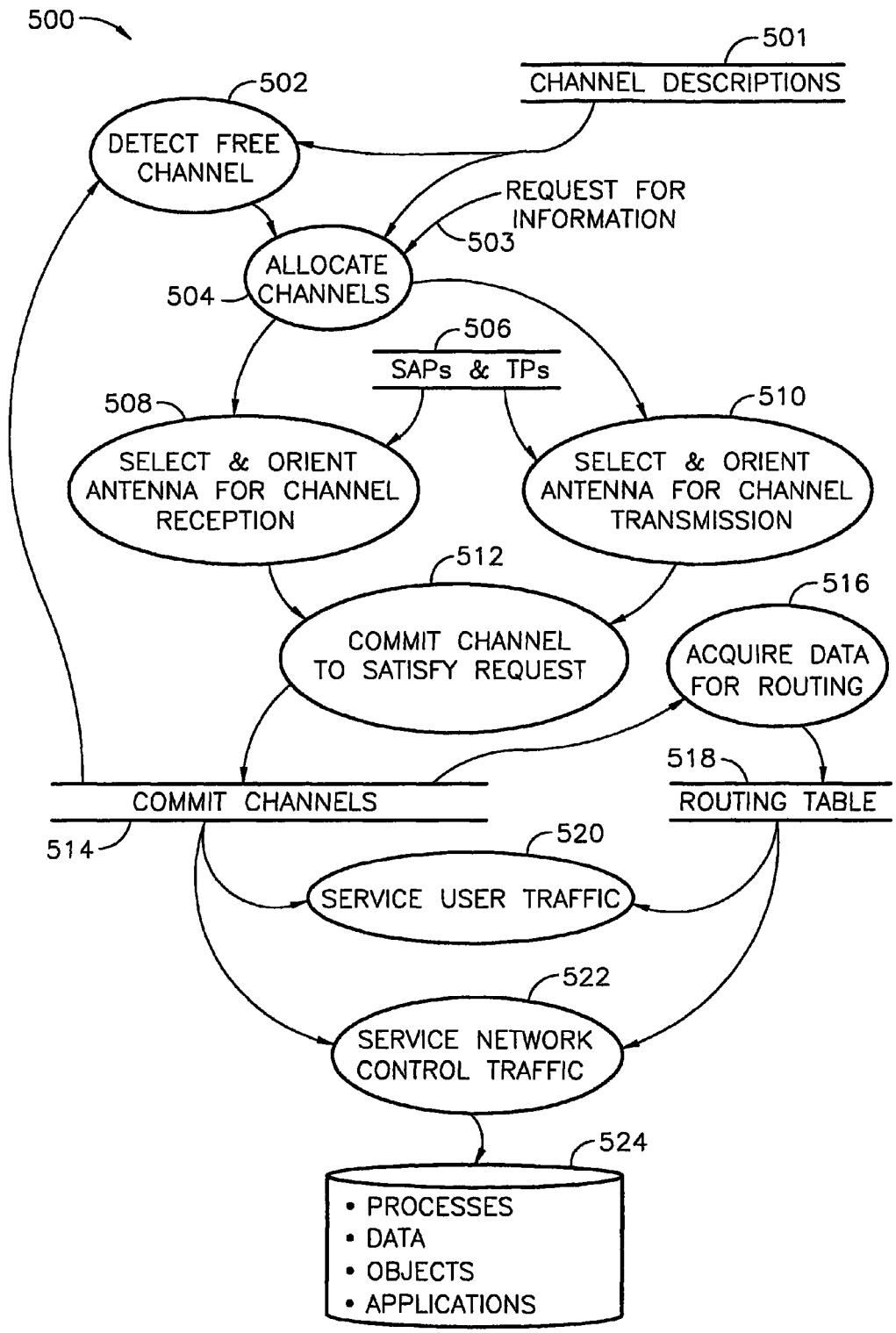
FIG. 5 is a data flow diagram of a process for forming the network of FIG. 1.

FIG. 4 depicts a SOMA communications conglomerate 400, wherein neighboring pairs of SIDA platforms are able to communicate with each other either directly or facilitated by a free channel within any given SIDA platform. The SIDA platform having a free channel may act as a so-called SIDA catalyst in the connection (performing a conveying function for this communication). As discussed above, each SOMA platform performs network protocols for assisting, directing, and informing about a given transmission as it occurs from an initiator (indicated "I" in FIG. 4) via one or more catalysts (indicated "B" in FIG. 4) via one or more coordinators (indicated "C" in FIG. 4) to a receiver (indicated "R" in FIG. 4). The SOMA platform monitors the routing and length of each communication (i.e., a call). Calls that are out of the WISB network are routed through a SOMA platform.

For example, SIDA 402 initiates a call to SIDA 426 that passes through SIDA 404, SOMA 420, SIDA 422, and SIDA 424. Calls may be direct as when SIDA 406 initiates a call to SIDA 408. Calls may overlap through a single SIDA. For example, SIDA 410 initiates a call to SIDA 416; and SIDA 412 initiates a call to SIDA 414. SIDA 412 acts as a catalyst for the former call and as an initiator for the latter.

FIG. 4 also depicts two unattached SOMA communications conglomerates 400 and 401 and illustrates their interaction. If a call initiated at SIDA 402 is directed to SIDA 436, the call is routed through a free channel in each intervening SIDA and SOMA platform: 404, 420, 430, 432, 434, and 436. Link 490 may be a fiber optic link as discussed above. In a variation, platforms 420 and 430 may be PAU platforms and link 490 a troposcatter or satellite link. The wireless multi-hop routing and multicast protocol governing the network routing system at SOMAs 420 and 430 automatically routes the call through SIDAs having the fewest hops (typically the closest SIDAs and shortest physical distances). The wireless multi-hop routing and multicast protocol always commands intervening SIDA platforms to use the shortest route to the recipient (R) to be taken around any given physical obstructions that may impair the line of sight (or that may not be in compliance with the IEEE 802.11B restrictions when using the 5.8 GHz unlicensed band).

A fiber optic cable for transporting communication between SOMA communications conglomerates 400 and 401 is necessary only when using the unlicensed 5.8 GHz frequency and complying with the IEEE 802.11B restrictions. If the network is built around a licensed frequency, the fiber optic link may be omitted, subject to the distance between the SOMA platforms and geographical constraints (line of sight).

Unattached SOMA communications conglomerates become attached when close neighboring SIDA platforms become available, as discussed above.

Transmissions are packetized and all packets are preferably transmitted through the shortest path through the network. Packets of the same call may travel different routes through the network, but as they arrive at the Recipient SIDA platform, the packets are assembled in the correct sequence. The channel access protocol algorithms will govern the entire transmission, and facilitate suitable quality of service at either end of the transmission cycle (Initiator and Recipient).

By adding platforms to a WISB network, additional routes are created facilitating delivery of data at greater bandwidth. For example, a maximum bandwidth achieved for a single SIDA may be calculated for each of several modulation and antenna configurations. Assuming all channels are of equal bandwidth, the maximum bandwidth for each row of Table 1 is calculated by multiplying the channel bandwidth (assumed to be 100 MHz for operation at 5.8 GHz) by the modulation factor; and multiplying the result by the beam factor. The beam factor assumes that full duplex communication is intended and two beams are therefore needed for the maximum bandwidth to be achieved. A modulation factor of 6 corresponds to quadriture amplitude modulation (QAM) having 64 steps and a factor of 8 corresponds to QAM having 256 steps. As shown, a single user consuming data from all input beams simultaneously of his or her SIDA platform can consume up to 25.6 Gbps half duplex and at the same time provide up to 25.6 Gbps half duplex on other output beams.

TABLE 1

| Modulation Factor | Number of Beams | Beam Factor | Maximum Single User Bandwidth (Gbps) |
|---|---|---|---|
| 6 | 16 | 8 | 4.8 |
| 8 | 16 | 8 | 6.4 |
| 6 | 32 | 16 | 9.6 |
| 8 | 32 | 16 | 12.8 |
| 6 | 64 | 32 | 19.2 |
| 8 | 64 | 32 | 25.6 |

A platform, according to various aspects of the present invention may join one or more existing networks or establish one or more new networks. Such a network, according to various aspects of the present invention employs channel diversity, spatial diversity (e.g., directional diversity and/or range diversity), path diversity, and time diversity to provide relatively high bandwidth service to each member of the network. After a platform has joined a network (herein called a new member platform), traffic carried by that network may be routed through the new member platform; traffic originating from the new member platform may be directed to any platform of the network; and traffic destined for the new member platform may be consumed by the new member platform. By routing traffic through the new member platform, additional simultaneous paths through the network may supply a destination platform with increased bandwidth.

By originating traffic from the new platform, multiple sources of data destined for a consuming platform may be distributed and coordinated to reduce the demand for bandwidth at each source platform. For example, when a duplicate of a file stored by an existing platform is now available from the new member platform, then the new member platform may supply data from the duplicate file, freeing the existing platform to supply other requests. When the consuming platform requests two files to be delivered simultaneously that otherwise would have been supplied by one existing member platform and now can be supplied by the existing and the new member platform (one file supplied by each source), the received bandwidth at the consuming platform may be effectively increased by the participation of the new member platform in the network (e.g., by the availability of additional and possibly more effective paths to the consumer). Without the obligation to deliver both files from the existing source platform, the bandwidth from the existing platform may be used to communicate regarding other requests of the consuming platform (e.g., possibly further increasing bandwidth to the consuming platform) or requests of any other platform.

A process, performed by a processor of a platform, to join a network (or form a new network in the absence of a suitable network) may be initiated as a consequence of determining one or more of the following conditions: (a) that the platform is currently not a member of any network (e.g., power being applied, power restored after interruption, or communication reattempted after interruption), (b) that signals of a network are being received, (c) that one or more communication channels are available, or (d) that a user or system administrator has made a manual or automatic (e.g., triggered by time of day) request for communication (e.g., to communicate with SIDAs, SOMAs, and/or PAUS). The request may be in addition to existing network memberships (if any) by this platform. For example, process 500 of FIG. 5 performed by a prospective member platform (e.g., a SIDA, SOMA, or PAU platform) includes processes that may be performed simultaneously or in any order whenever inputs for each process are sufficient for processing. Process 500 includes channel descriptions store 501, detect free channels process 502, allocate channels process 504, sector allocation pattern and tile pattern store 506, select and orient antenna for channel reception process 508, select and orient antenna for channel transmission process 510, commit channel to satisfy request process 512, committed channels store 514, acquire data for routing process 516, routing table store 518, service user traffic process 520, service network control traffic 522, and software store 524.

Stores of process 500 may be organized according to any conventional data storage technology (e.g., data base, array, linked list) and stored by any conventional data storage technology (e.g., disk system (e.g., removable media, or storage area network), or memory system (e.g., RAM, EEPROM, or removable PCMCIA devices)). Process 500 may be performed solely by a processor (e.g., 202 of FIG. 2) having any suitable data storage system. In alternate implementations, processes of process 500 are performed by the cooperation of one or more processors 202 and one or more processing circuits and memory systems of transceiver unit 204.

A channel as used herein includes any mechanism and signaling used to effect communication. For example, a single frequency may be called a channel where a narrow band surrounding a designated frequency (e.g., a carrier frequency) is sufficient for suitable modulation. Generally, a channel may use any number and width of frequency bands in the electromagnetic spectrum including magnetic signaling, optical signaling, and preferably microwave radio signaling. Channel descriptions store 501 includes parametric values used to configure the structures and functions of transceivers (204) and antennas (206) including frequency band(s) allocated to a channel, modulation used for the channel (e.g., values for desired QAM techniques, values for desired spread spectrum communication), timing for channel utilization (e.g., time domain multiplexing of transmit and receive functions, slot numbers, utilization schedule based on calendar and time of day), and may include reservations or designations for desired utilization (e.g., priorities).

Detect free channel process 502 operates one or more transceivers 204 in any conventional manner to determine availability of a channel as described by store 501 for a desired period of time and/or beginning at a desired time of day. Such a determination may result from a predetermined right to use a channel and current or planned nonuse of a transmitter on that channel; absence of received modulation on one or more channels; reception of network control traffic advising that a channel is or will be free or reserved to this platform; or as directed by a user or system administrator. Committed channels as indicated in store 514 may be omitted from availability testing.

Allocate channels process 504 receives a request for communication 503 and provides status to the source of the request (e.g., notice of service granted for the request, scheduled service to be granted, scheduled change or termination of service, or unexpected failure). The allocation may be provisional depending on the success or failure reported by commit process 512.

A request for communication may originate from the operating system of the processor performing a process of process 500, or an application program hosted at least in part by such an operating system. Each new request may be queued in any conventional manner and granted in addition to or in replacement of other requests. The request may seek any one or more communication links discussed above (171, 174, 151, 154, 131, 134 or 148). For example, a platform currently servicing SIDA to SIDA communication may seek SIDA to SOMA communication of the same or a different network.

Antennas may be selected and oriented for channel reception (508) or channel transmission (510) using any conventional technology. Antennas may be separately selected and oriented or the orientation of a first antenna may prescribe a desired orientation for one or more other antennas. An oriented antenna may be used for both reception and transmission. Orienting an antenna for one of reception and transmission for the same channel may thereby be omitted.

According to various aspects of the present invention, orienting may be accomplished using one or more feedback loops. Received signal strength in the discussion below includes analog or digital measures of effectiveness of reception including signal to noise ratio, signal amplitude, or error rate as defined by a signaling or communication protocol. In a first feedback loop, antenna direction is affected in response to received signal strength at directions prescribed by a scanning sequence of directions. Antenna sensitivity for reception may be electronically changed to accomplish the scanning sequence. In a second feedback loop, received signal strength is reported to a mechanical system that moves one or more elements of an antenna circuit to accomplish the scanning sequence. In a third feedback loop, received signal strength is reported to a user (e.g., color and/or brightness of one or more LEDs, analog readout, numeric readout) who moves one or more antenna elements (e.g., rotates the antenna unit by its enclosure) to accomplish a suitable received signal strength. In a fourth feedback loop, transmitting according to a scanning sequence of directions is performed in concert with receiving (e.g., omnidirectional reception) as discussed above to orient a transmitting antenna and/or receiving antenna for a channel. The transmitted signal may include a request for reply on any channel (e.g., a predefined channel for antenna orientation).

A platform typically includes an antenna circuit capable of communication in more than one prescribed direction. Communication may be in time sequence as to directions or simultaneous in prescribed directions. Each direction may correspond to a lobe of substantially sufficient received signal gain or substantially effective transmitted signal beam width. Considering communication as line of sight in a plane with the antenna centered on an origin of a planar coordinate system, each direction may be of uniform angular extent about the origin. A platform may employ communication in a horizontal plane (e.g., to service a single story warehouse with adjoining office space), a vertical plane, a combination of horizontal and vertical planes (e.g., for cooperation among offices in a skyscraper), or in a cylindrical or spherical manner (conforming to the architecture of a building, shaft, or vehicle).

According to various aspects of the present invention, networks include platforms that each adapt to existing and dynamically revised network conditions to exhibit channel diversity, spatial diversity (directional diversity and/or range diversity), path diversity, and timing diversity (e.g., serial message formats and timing per IEEE 802.11B). For example, a platform may orient antennas and select channels according to a set of directions. A set of directions may include for each direction a prescribed antenna orientation and one or a set of channels suitable for that direction. Use of such a set of directions facilitates adding and deleting platforms from the WISB network. For example, a suitable antenna circuit of antenna unit 206 may be operated to provide communication in six directions, one direction in each sector, each sector having an equal planar angular extent (e.g., 60 degrees). The orientation of an antenna for one of the six directions (a lobe or a beam) may be sufficient to ascertain a proper orientation for the antenna unit to operate in each of all six sectors.

A network, according to various aspects of the present invention, includes a multitude of relatively closely spaced platforms that are placed in a region to provide communication using a relatively small set of directions and channels. The directions and channels used by platforms in the region are organized in an array of juxtaposed tiles, each tile having a tile pattern (TP). In a simple form, the array consists of multiple copies of the same tile pattern. A tile pattern comprises an arrangement of particular sector allocation patterns. Each sector allocation pattern (SAP) of a tile has a position in the tile pattern. An SAP typically comprises a dimensioned arrangement of juxtaposed sectors and a channel designation for each sector. By designating a channel for each sector, SAPs and TPs may be composed and placed in the region for intentionally facilitating communication between adjacent sectors or intentionally avoiding interference between communications in adjacent sectors. Because the sets of directions and channels are relatively small, both orientation of antennas and selection of channels are simplified. In a preferred implementation, select and orient antennas processes 508 and 510 refer to tile patterns (TPs) and sector allocation patterns (SAPs) of store 506 to simplify orientation and selection. For example, when all TPs in store 506 implement equally spaced six-sectored SAPs using three channels, antenna orientation is limited to +/−30 degrees and communication on only the three channels need be attempted.

When a particular TP and SAP to be implemented by the prospective member platform for the request (503) is ascertained (e.g., by default, user intervention, or by network control traffic), orientation (508 or 510) may be ascertained by a feedback loop wherein a difference between a measured magnetic compass bearing and a preferred heading is substituted for received signal strength as discussed for feedback loops above.

Commit process 512 concludes that the allocated channel is suitable for communication and so modifies committed channels store 514. This conclusion may depend on several conditions, including one or more of: (a) whether a suitable TP can be determined to be used by the prospective member platform; (b) if a particular TP is to be used by the prospective member, whether a suitable SAP and position in the particular TP are available; (c) whether an identity for the prospective member platform can be uniquely determined; (d) whether a suitable range diversity is sufficient for operation in an existing network or to form a new network; (e) if the prospective member requires an integrated network and multiple networks are determined to exist within range (as opposed to separately participating in each existing network), whether a suitable TP for an integrated network is determined (e.g., whether existing networks can reform to eliminate potential incompatibility of TPs and/or SAPs); and (f) whether suitable routing tables may be established for providing path diversity as a member of the network.

Platforms in a network according to various aspects of the present invention may operate as either a master access point (MAP) or a slave access point. A MAP maintains network control information as a sole authority and conducts network control functions suitable to a sole authority. Each network typically has one platform operating as a MAP. An alternate implementation includes redundant platforms cooperating to avoid degradation of the MAP function (e.g., availability or responsiveness). For example, in the network of FIG. 1, one platform (e.g., 142) at each layer (e.g., 160) may serve as a MAP for all links of that layer (e.g., 154, 155). In variations, one platform (e.g., 142) at a particular layer (e.g., 160) may serve as a MAP for links with and/or among platforms of a lower layer (e.g., link 131-135 of layer 120), a higher layer (e.g., links 174, 175 of layer 170), or for all links and layers. Network control information may include a designated TP, a designated position of the MAP in that TP, a designated SAP to be used at that position in the TP (defining channel diversity and spatial diversity), an orientation of that TP and SAP (e.g., with reference to magnetic north), a preferred range (e.g., a power level for transmitting to other network members of the same type (e.g., SIDA to SIDA), power level for transmitting to platforms of other types (e.g., SIDA to SOMA) and power levels for particular types of messages such as requests for MAP reply), and receiver sensitivity settings for communications corresponding to the various transmitter power levels.

In a network wherein a prospective member platform expects a MAP to dictate a tile pattern, commit channel process 512 includes suitable communication with the MAP prior to committing the channel to satisfying request 503. In an alternate implementation, network control information as discussed above may be obtained by the prospective member platform by suitable communication with one or more immediate neighbor platforms that maintain secondary copies of some or all of the network control information.

Process 512 may determine whether an identity for the prospective member platform can be uniquely determined with reference to its own configuration control information (e.g., a unique factory assigned identification) or by communication with a conventional name service of the network. A name service may be performed by any platform, preferably by a MAP.

Process 512 may conduct communication at a sequence of ranges beginning with a shortest range to a longest range in seeking communication with neighbor platforms to avoid interference with other network traffic. Process 512 may conduct communication destined for a MAP at a sequence of ranges beginning with a longest range to a shortest range until a suitable MAP responds (e.g., exactly one MAP for the most local network).

Upon determining a failure of any condition for committing a channel, as discussed above, process 512 may decommit the allocated channel and report decommission to allocate process 504; whereupon, allocate process 504 may report to the source of request 503 that the request is denied at the present time. Failure to acquire suitable routing information may be reported to process 512 by process 516. On the other hand if suitable conditions for committing one or more channels to satisfy the request are met, commit process 512 makes an entry in committed channels store 514. The entry may include identification of the committed channels; and indicia of the request indicating for example a basis for automatic decommission (e.g., based on conditions such as failure at higher protocol levels or calendar date and time).

Acquire data for routing process 516 initiates and participates in network control traffic to make entries in routing table store 518. Such network control traffic may include conventional messages broadcast to flood the network. Replies to such messages are used by process 516 to determine one or more paths to particular destination platforms (e.g., primary, secondary, tertiary); and estimate communication quality for each path (e.g., responsiveness, hop count, and/or bottlenecks as a consequence of SAP geometry).

Routing table store 518 stores tuples of routing information. For example, each tuple may associate a set of one or more indicia of suitable channels with an identity of a destination platform. Indicia of priority, quality of service, and availability (preferred calendar date and time of day) may also be included in each tuple. Any conventional organization of routing information may be used. For example, access that is indexed by destination platform identification may be used for efficient reference by processes 520 and 522.

Network control traffic is generally distinguished from user (e.g., data) traffic in that network traffic typically includes requests or confirms of changes in network configuration, reports of status of a platform, and reports of network control information. Conventional message headers are generally sufficient to identify whether a particular message is user traffic or network control traffic.

Service user traffic process 520 refers to committed channel store 514 and to routing table store to initiate and participate in communication for users within the range of each channel. Generally, for a SIDA 122, each user device 110 is a user; for a SOMA 142, each SIDA is a user; and for a PAU 162, each SOMA is a user. Service includes routing of messages sourced from or destined to a user of the platform; and routing of messages on paths that include the platform.

Service network control traffic process 522 refers to committed channel store 514 and to routing table store to initiate and participate in communication for network control functions. The same network may be used for both user traffic and network control traffic. Alternatively, a first network may be used for user traffic and a second network may be used for network control traffic regarding the first network. The second network may further be used for network control traffic regarding the second network. First and second networks may be distinguished in that each has its own MAP and possibly its own implementation for channel diversity, spatial diversity, and path diversity (e.g., different channels, TPs, SAPs, orientations, naming service, and/or routing information). Network control traffic may include new and/or updated information regarding the operating system, processes (e.g., process 500), applications programs, objects, and data to be used by the prospective member platform. Such new and/or updated information is received by service process 522 and stored in software store 524.

The design of a network of the type described herein may include determining a set of channels for user and/or network control traffic. The set typically has relatively few members for economy of transceiver design and operation under the regulations of various governmental bodies. Further, the design may include determining a geometry for spatial diversity. According to various aspects of the present invention, particular arrangements of channels and spatial patterns may be used to facilitate network expansion. Network expansion may be accomplished by adding channels to the set of channels, adding ranges or directions for increased spatial diversity, changing communication protocols for increased effectiveness of time diversity, and/or adding platforms for increased path diversity. Networks may be expanded to serve additional users and/or to improve the quality of communication on particular links. For example, traffic that would otherwise traverse a link at a time when the link has limited bandwidth (e.g., due to nearly full utilization by platforms logically or physically near the link) may be avoided by locating a platform logically and/or physically near the link to increase path diversity.

For a network 100 according to various aspects of the present invention, the set of channels for all communication may be limited to three channels. In a first implementation spatial diversity is implemented using an antenna unit serving four quadrants of equal size and range. A sector allocation pattern (SAP) may be defined wherein the platform is at the geometric center of the SAP. Six unique sector allocation patterns are sufficient to define six unique tile patterns. Each tile pattern (TP) may be used to completely service a region without interference (or communication) between juxtaposed sectors. Communication between sectors may be implemented by wired connections between adjacent platforms (e.g., a conventional wired LAN); or implemented with any wireless network. Coverage of the region for network access by users in the region (herein called tiling) may be accomplished by arranging each new tile in exactly the same orientation beside any tile that is already arranged in the region. Uninterrupted coverage may be accomplished by abutting tiles at or just less than the range of each channel. Overlapping sectors may be desired for redundant coverage. The resulting array consists entirely of the same tile in the same orientation.

Figure 6A:
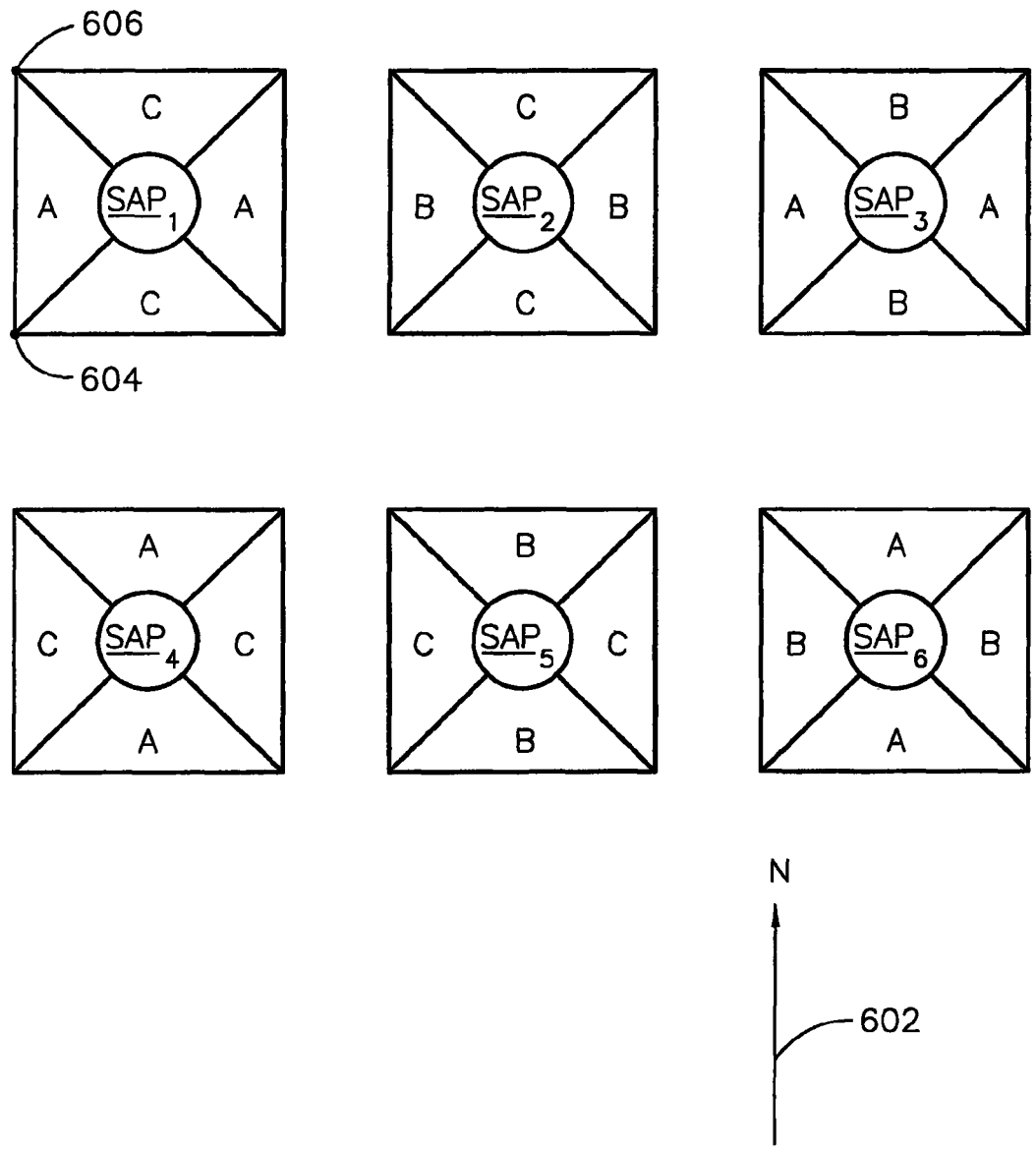
FIG. 6A is a diagram of rectangular sector allocation patterns according to various aspects of the present invention and FIG. 6B is a diagram of tile patterns using the sector allocation patterns of FIG. 6A.
Figure 6B:
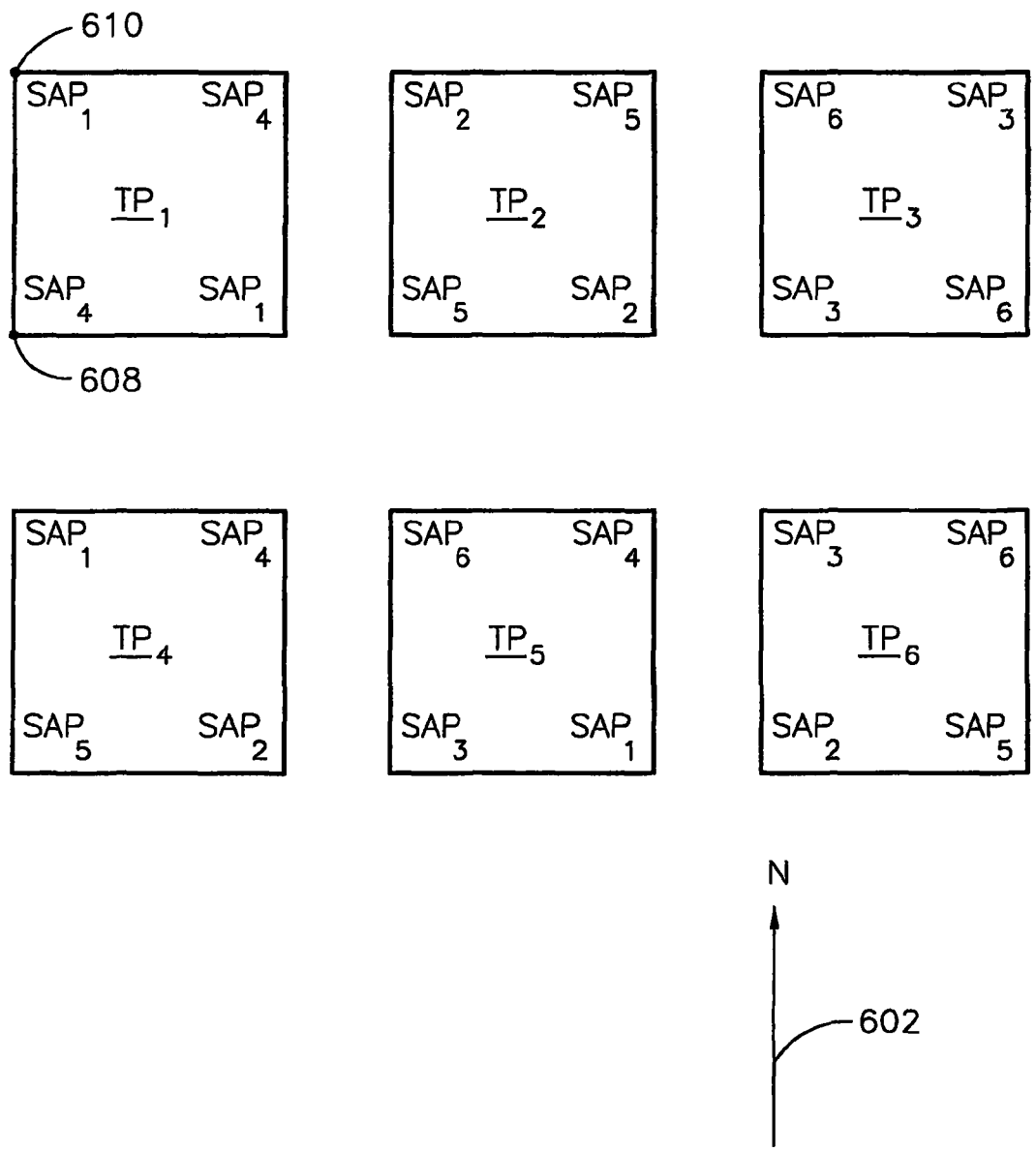

For example, FIG. 6A describes sector allocation patterns $SAP_1$ through $SAP_6$ having channels A, B, and C. In an alternate implementation east-west range may differ from north-south range to define rectangular (as opposed to square) SAPs. Tile patterns $TP_1$ through $TP_6$ are described in FIG. 6B. The orientation of the SAPs and TPs is shown with reference to a bearing to magnetic north 602. For example, line segment 604-606 of $SAP_1$ (and corresponding segments of other SAPs) is aligned parallel to bearing 602. Further, line segment 608-610 of $TP_1$ (and corresponding segments of other TPs) is aligned parallel to bearing 602. Each TP consists of four positions referred to as north-east, south-east, south-west, and north-west. One SAP of FIG. 6A is indicated for each position of each TP on FIG. 6B.

In a second implementation, spatial diversity is implemented using an antenna unit serving six wedges of equal size and range. A sector allocation pattern (SAP) may be defined wherein the platform is at the geometric center of the SAP. Six unique sector allocation patterns are sufficient to define eight unique tile patterns. Each tile pattern (TP) may be used to completely service a region without interference (or communication) between juxtaposed sectors. Communication between sectors may be implemented by wired connections between adjacent platforms (e.g., a conventional wired LAN); or implemented with any wireless network. Tiling may be accomplished by arranging each new tile in exactly the same orientation beside any tile that is already arranged in the region. Uninterrupted coverage may be accomplished by abutting tiles at or just less than the range of each channel. Overlapping sectors may be desired for redundant coverage. The resulting array consists entirely of the same tile in the same orientation.

Figure 7A:
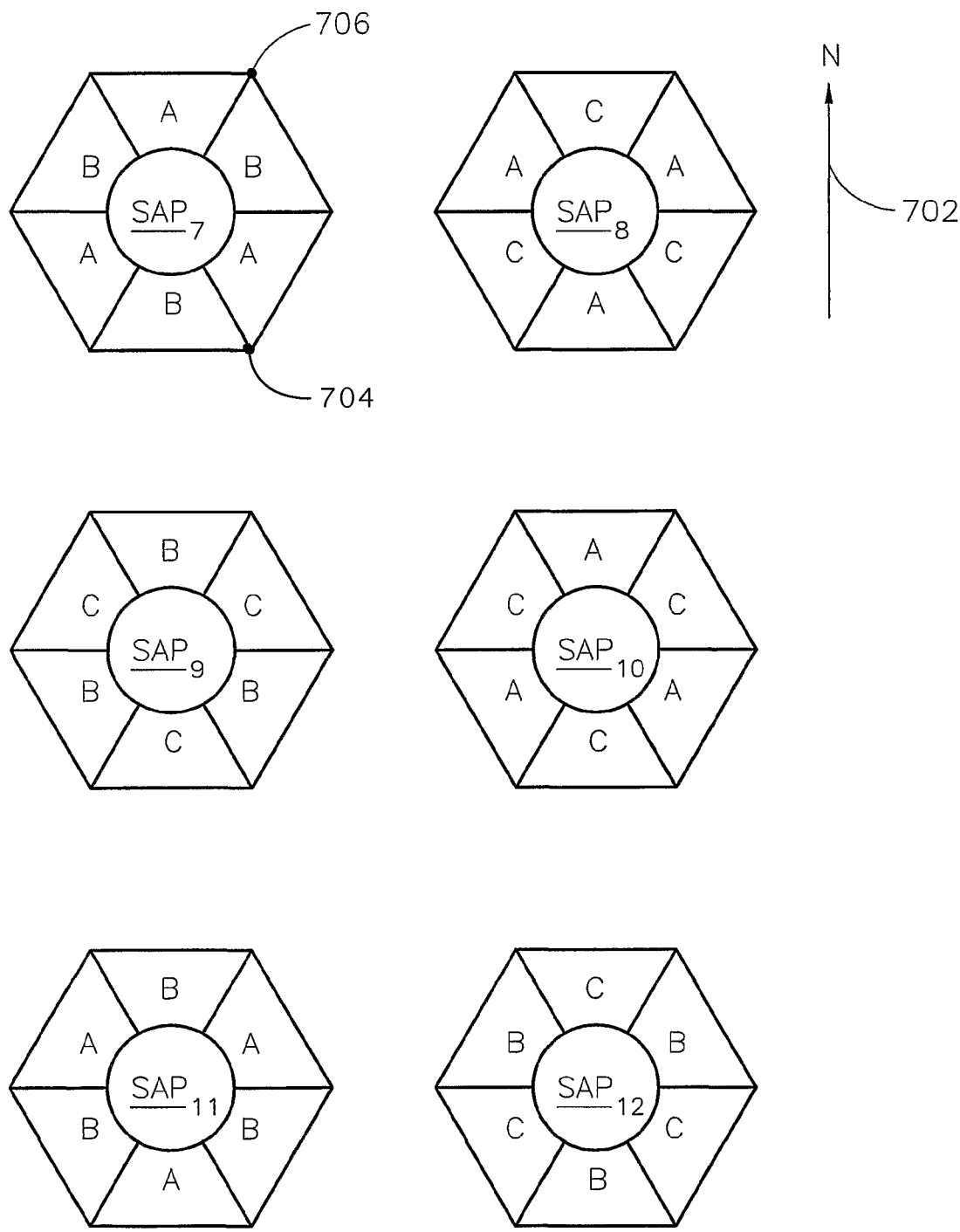
FIG. 7A is a diagram of hexagonal sector allocation patterns according to various aspects of the present invention and FIG. 7B is a diagram of tile patterns using the sector allocation patterns of FIG. 7A.
Figure 7B:
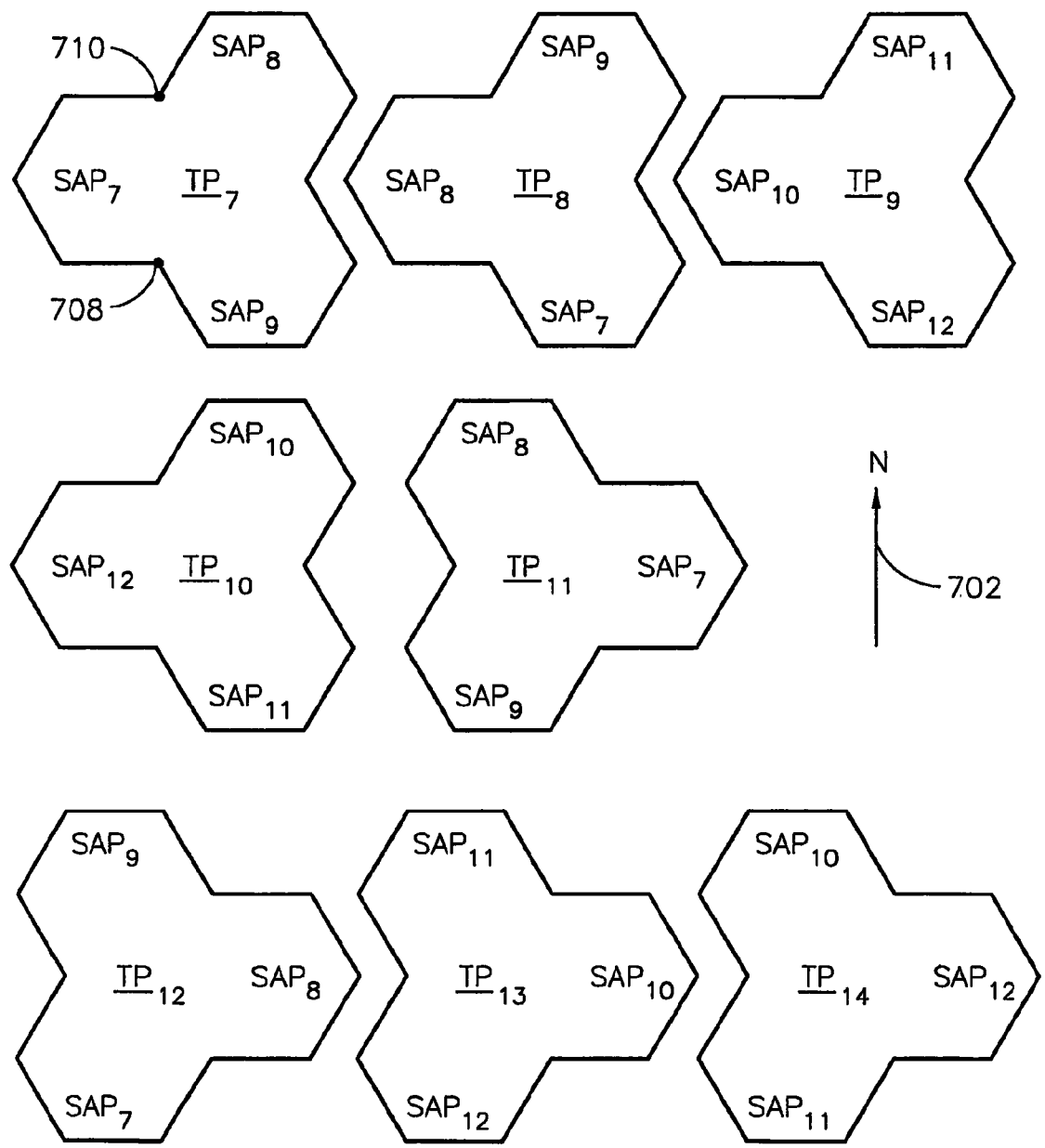

For example, FIG. 7A describes sector allocation patterns $SAP_7$ through $SAP_{12}$ having channels A, B, and C. The geometry of each SAP is a regular hexagon. Tile patterns $TP_7$ through $TP_{14}$ are described in FIG. 7B. The orientation of the SAPs and TPs is shown with reference to a bearing to magnetic north 702. For example, line segment 704-706 of $SAP_7$ (and corresponding segments of other SAPs) is aligned parallel to bearing 702. Further, line segment 708-710 of $TP_7$ (and corresponding segments of other TPs) is aligned parallel to bearing 702. Each TP consists of six positions referred to as north, north-east, south-east, south, south-west, and north-west. One SAP of FIG. 7A is indicated for each position of each TP on FIG. 7B.

Antenna unit 206 may include antenna circuits sufficient for the platform to exhibit more than one spatial diversity. When antenna unit 206 includes conventional antenna circuits organized as a phased array, spatial diversity for use in a network may be dynamically revised. For example, a platform with 6 transceivers may be configured to initially operate with $TP_1$ and later be automatically reconfigured to operate (e.g., by network traffic originated by a MAP) with any other tile pattern (e.g., $TP_2$ through $TP_{14}$). Increased bandwidth may result when the new tile pattern provides additional diversity (e.g., six rather than four directions and consequently more paths).

A method, according to various aspects of the present invention, provides wireless access to the network of FIG. 1 for users located in a region. The same method may be used to provide a wireless network among platforms located in the region. As a result of practice of this method, a network having range diversity may be integrated (e.g., one network having one MAP). An access point is placed at a physical location corresponding to the center of each SAP of each TP that is recorded in a map (e.g., floor plan) after tiling of the region has been accomplished according to the method. An access point as used herein is synonymous with a platform of any type (e.g., a SIDA platform or a platform having SIDA functions). Generally, the number of access points is determined to provide each access point with a similar estimated volume of traffic or is located with respect to other access points to improve path diversity as discussed above. Range diversity may be used to level the traffic volume per access point.

The method may be performed in response to the desire or request for an additional network (e.g., request 503 as discussed above); or in response to a desire or request to reconfigure an existing network. The method may be performed manually as when a facility is mapped (e.g., floor plans) for initial placement of access points; or automatically as when one or more additional access points become within range of one or more networks and an integrated network is to be automatically established. Typically, the method is performed by a human network administrator or any platform, for example, a MAP.

Figure 8:
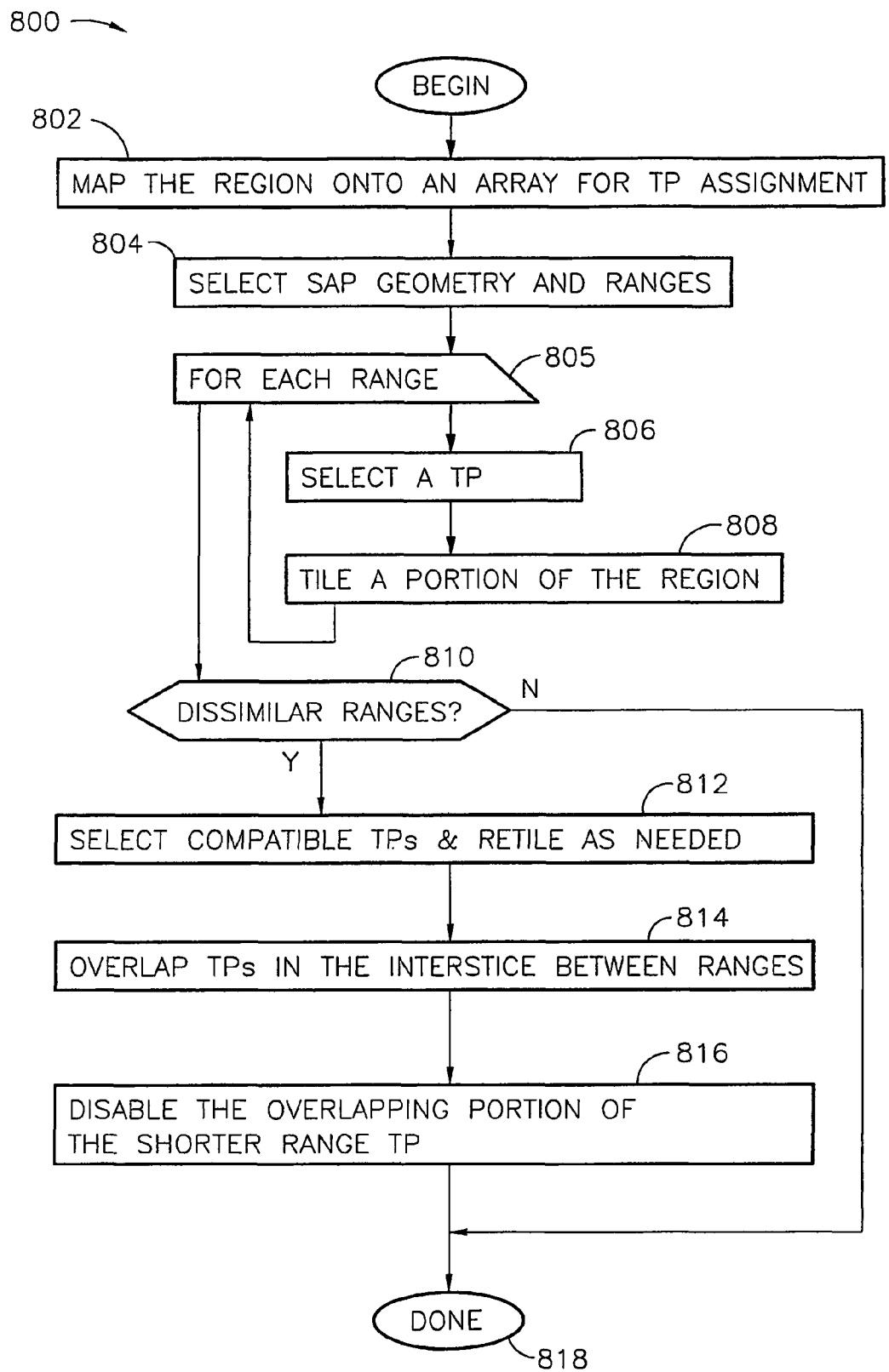
FIG. 8 is a process flow diagram of a method for providing wireless access to the network of FIG. 1 for users located in a region and for providing a wireless network among platforms located in the region.

Operations of the method are explained below with reference to an example, method 800 of FIG. 8. To begin, the region to be served (e.g., the region where users will be located permanently (FWA) or temporarily (MWA)) is mapped (802) onto an array for TP assignment. The array may be organized as any conventional storage mechanism and serves to record TP assignments with respect to physical portions of the region. One or more SAP geometries are selected (804) and the geometries scaled for suitable range. Generally, the differing ranges are an integer multiple of each other (preferably 2 or 4). Preferably the SAP geometry and range permit coverage of the region without dead zones (e.g., areas that are not within range of any access point). SAPs with equal range are preferred for covering regions having few irregularities. Any SAP may extend beyond the region's boundary when there is no issue of interfering with another communication system. In one implementation, an SAP with relatively long range is used for coverage of a warehouse with smaller user density; and, an SAP with relatively short range is used for coverage of an office with larger user density. SAPs of FIGS. 6A and 7A are preferred.

For each range, a TP is selected (806). Selection may be based on desired number of channels and channel characteristics for avoiding interference with other communication systems and for providing channels for additional wireless networks of the present invention to be implemented so as to coexist over some or all of the same region, perhaps to meet future user density (e.g., additional platforms or additional end users such as greater mobile traffic). Portions of the region for each selected TP are then tiled (808). Tiles may be abutted or overlapped to any desired extent. Overlapping tiles may improve communication reliability at extreme range. Tiling with the same TP proceeds to completely cover that portion of the region having a desired range and stops short of any other portion of the region where a different range is desired.

If (810) the region is completely tiled using one TP, no further action (818) is desired and network operation may proceed (e.g., according to process 500 or 1100). Otherwise, compatible TPs are selected and retiling with alternate TPs proceeds (812). A trial and error basis may be used when only a few alternative sets of compatible TPs are available for use. Available TPs are generally limited (or relieved) by the existing (or revised) capabilities of antenna unit 204 in each platform used as an access point.

When portions of the region are tiled up to an interstice between portions tiled with different TPs (e.g., a first TP having a first range and a second TP having a second range), the interstice may be filled with SAPs (e.g., selected portions of the second TP) having the smaller range (e.g., the second range). Typically a portion of the smaller range TP will overlap (814) the larger range TP and that overlapping portion is disabled (816).

Selecting compatible TPs and retiling (812); overlapping (814); and disabling (816) may be repeated to tile an interstice where the ranges of the TPs differ by a multiple of a smaller integer (e.g., 2 or 4). For example, when the ranges differ by a factor of four, the interstice may be tiled in part with SAPs of half the larger range and tiled in part by SAPs of one quarter the larger range (i.e., the smaller range).

Figure 9:
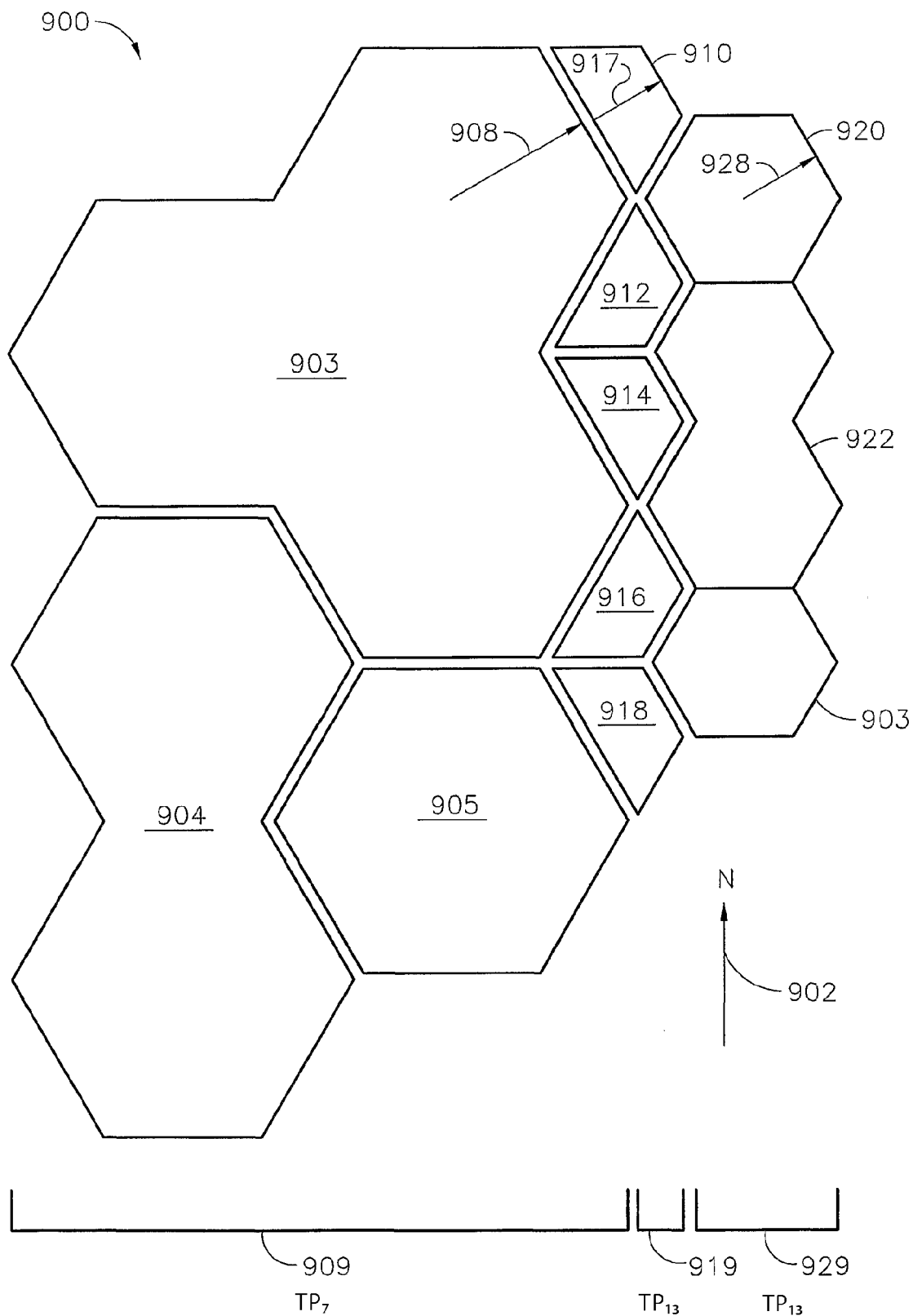
FIG. 9 is a diagram of an arrangement of tile patterns according to various aspects of the present invention.
Figure 10:
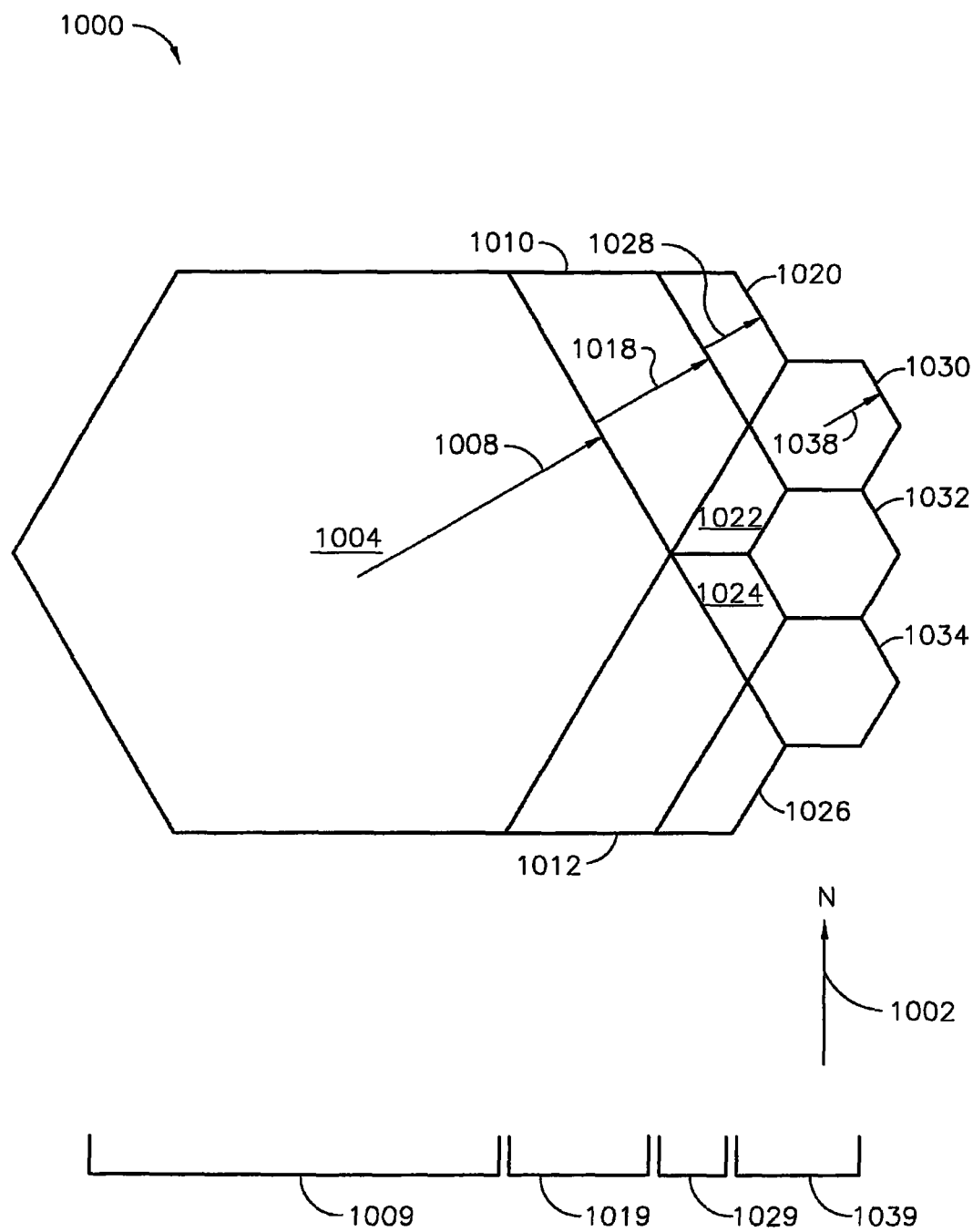
FIG. 10 is a diagram of another arrangement of tile patterns according to various aspects of the present invention.
Figure 11A:
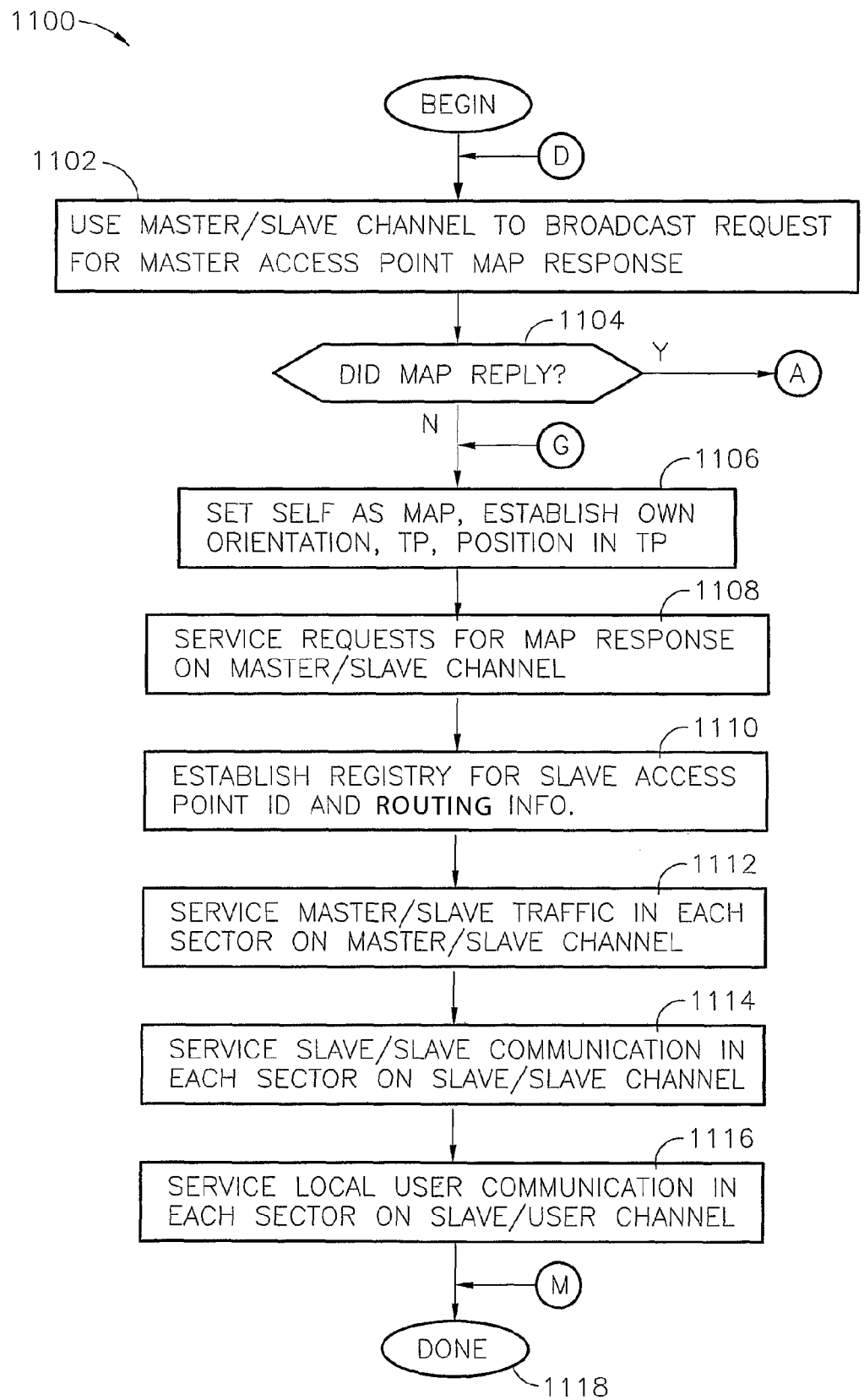
FIGS. 11A-11E present a process flow diagram of a method for establishing a network according to various aspects of the present invention.
Figure 11B:
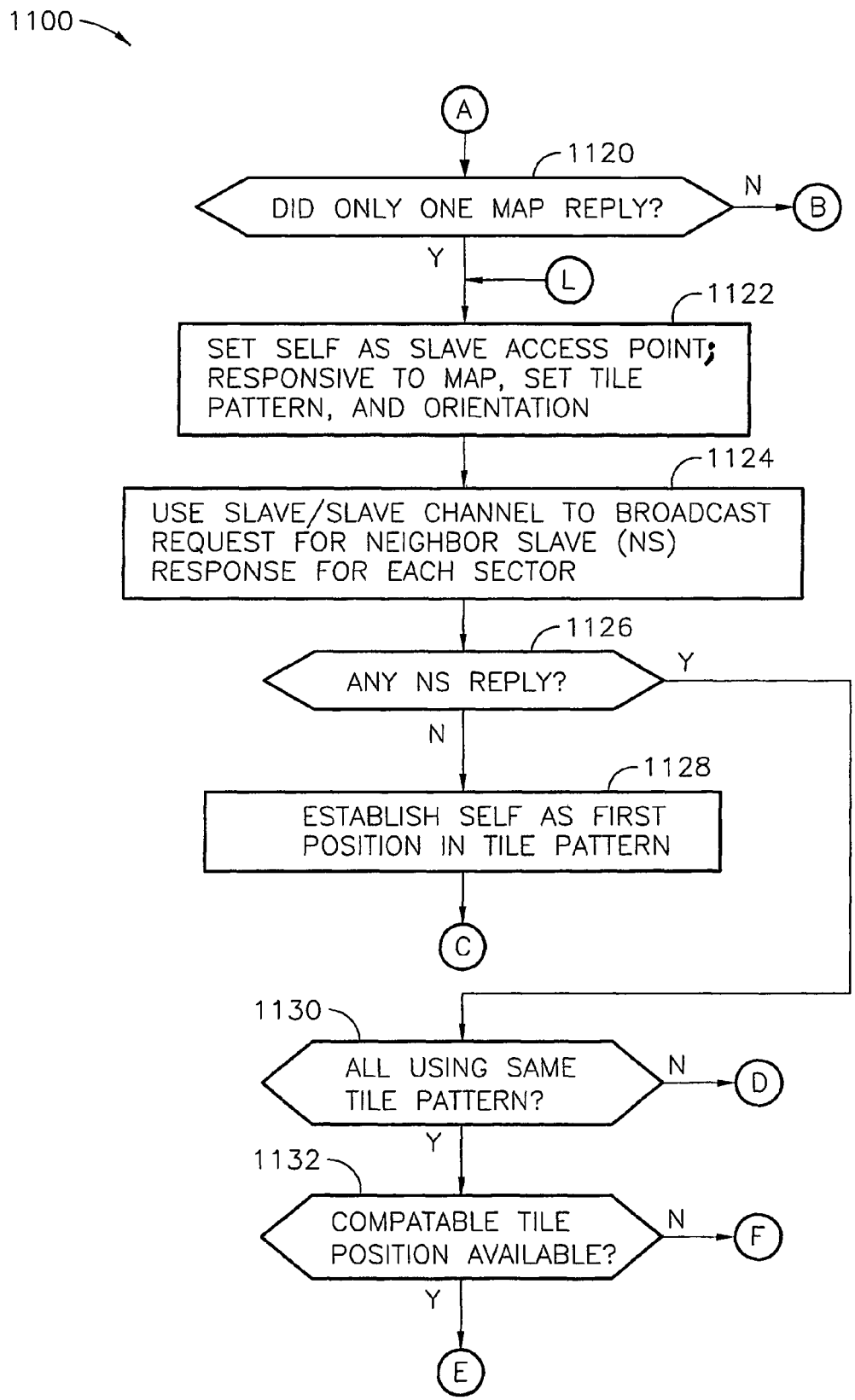
Figure 11C:
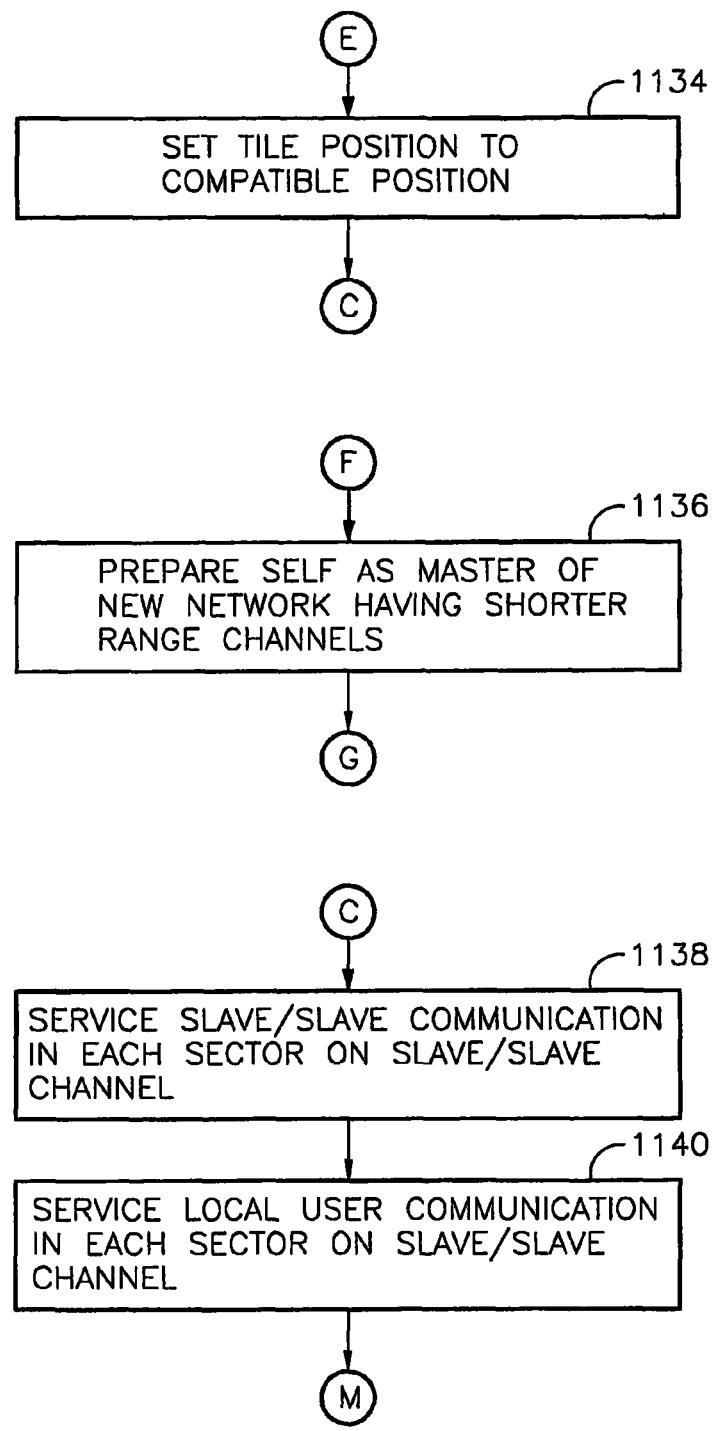
Figure 11D:
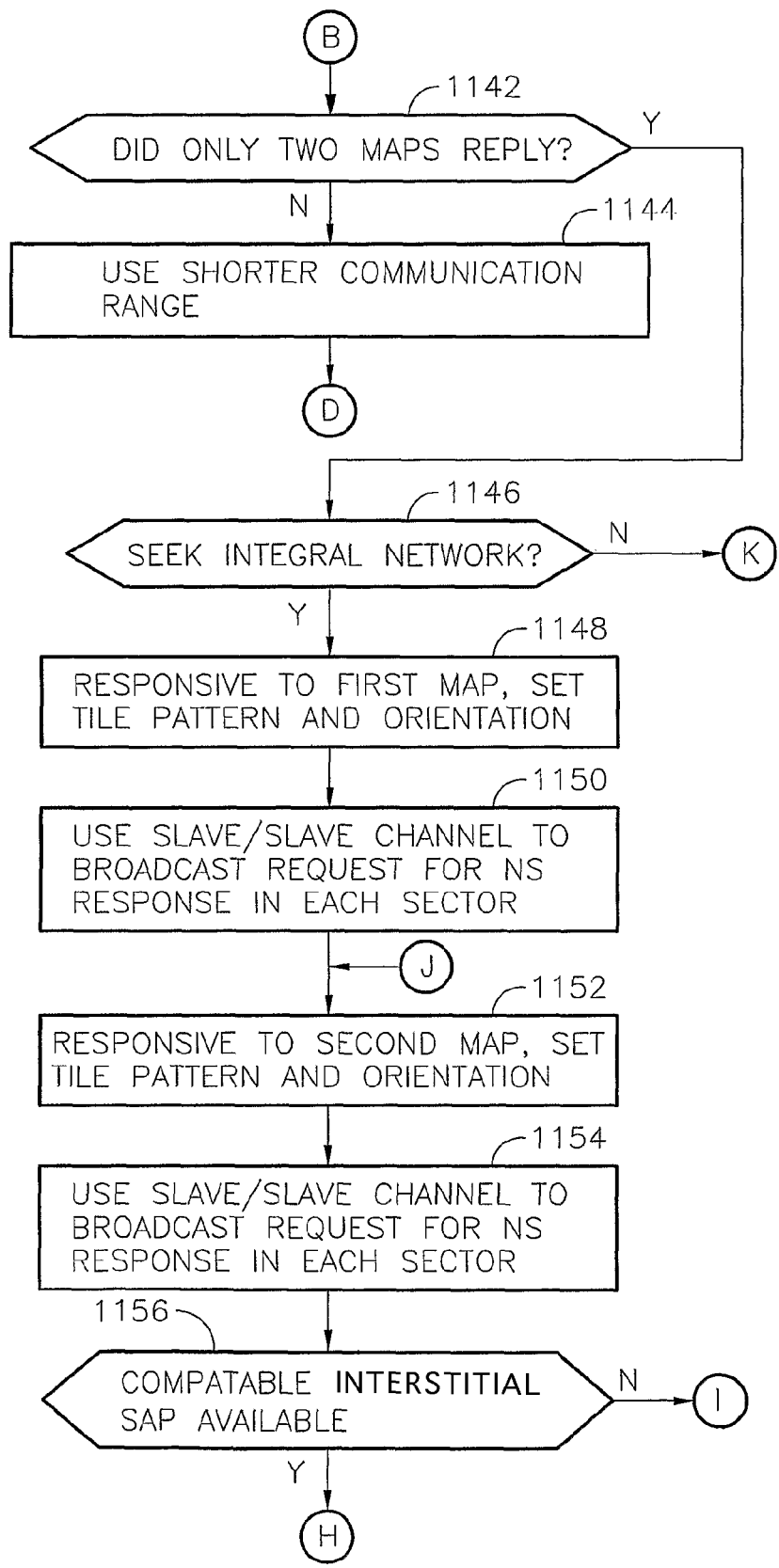
Figure 11E:
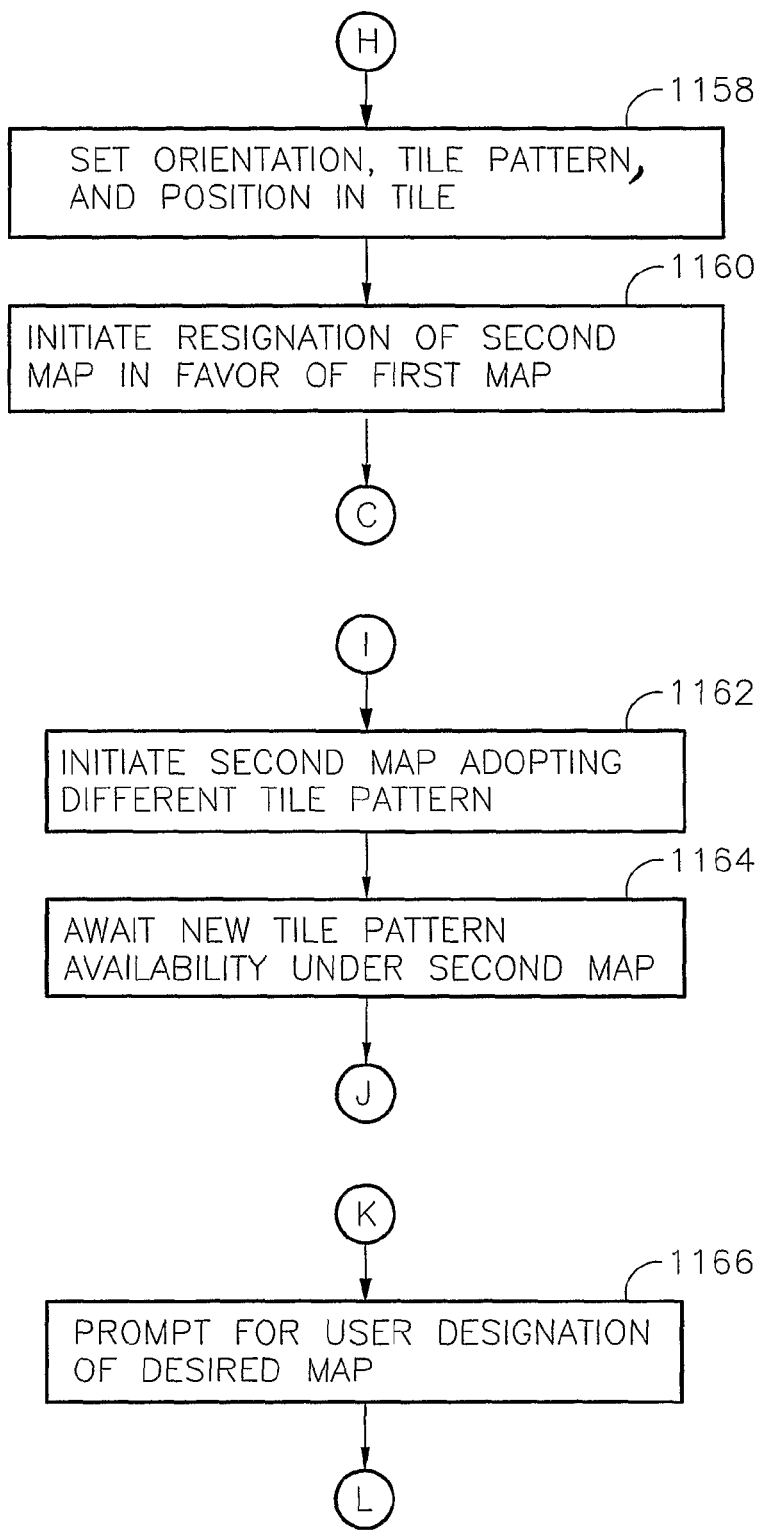

In the example networks of FIGS. 9 and 10, sectors that face each other are not intended to communicate. Tiling patterns were selected to avoid interference between facing sectors of juxtaposed SAPs. Communication between access points may be provided by a LAN wired to each access point; or, by providing additional communication capability at each access point for a wireless network (e.g., a wireless network of the type described herein using non-interfering communication by virtue or any one or more of: channel diversity, spatial diversity, and time diversity. For example when the networks described in FIGS. 9 and 10 are implemented using channels per IEEE 802.11B, communication between access points may be implemented using a wireless network as described herein using channels per IEEE 802.11A.

A region 900 of FIG. 9 is tiled according to method 800. As a result 15 access points are placed in region 900. Region 900 includes portion 909 for SAPs of range 908 (e.g., 100 feet), portion 929 for SAPs of range 928 (e.g., 50 feet); and an interstitial portion 919 for SAPs of range 917 (e.g., 50 feet). With reference to magnetic bearing 902, portion 909 is tiled per $TP_7$ where: (a) tile 903, having three positions, includes an access point for each position; (b) tile 904 has one access point located in the north position of $TP_7$ and one access point located in the south position of $TP_7$; and (c) tile 905 has one access point, located in the west position of $TP_7$.

Portion 929 is tiled per $TP_{13}$ where: (a) tile 920 has one access point located in the east position of $TP_{13}$; (b) tile 922 has one access point located in the north position of $TP_{13}$ and one access point located in the south position of $TP_{13}$; and (c) tile 924 has one access point located in the east position of $TP_3$.

Five access points are located in the interstitial portion 919, one in each SAP 910-918. Each SAP 910-918 is selected to continue the tiling of pattern $TP_{13}$. A suitable half of each SAP is disabled. In other words, SAP 910 (and 916) corresponds to $SAP_{11}$ for the north position of $TP_{13}$ with the north-west, south-west, and south sectors disabled. SAP 912 (and 918) corresponds to $SAP_{12}$ for the south position of $TP_{13}$ with the north, north-west, and south-west sectors disabled. SAP 914 corresponds to $SAP_{10}$ for the east position of $TP_{13}$ with the north-west, south-west, and south sectors disabled.

A region 1000 of FIG. 10 is tiled according to method 800 as discussed above. Here, the ranges of the TPs differ in two steps using an integer factor of 2. Range 1008 is twice the length of range 1018. Range 1018 is twice the length of range 1028. Range 1028 is twice the length of range 1038. Consequently, selecting compatible TPs and retiling; overlapping; and disabling were repeated to tile a first interstice 1019 and a second interstice 1029 between the first portion 1009 and the second portion 1039. As a result, 10 access points are placed in region 1000. Region 1000 includes portion 1009 for SAPs of range 1008 (e.g., 1000 feet), a first interstitial portion 1019 for SAPs of range 1018 (e.g., 500 feet); a second interstitial portion 1029 for SAPs of range 1019 (e.g., 250 feet); and a portion 1039 for SAPs of range 1038. With reference to magnetic bearing 1002, portion 1009 is tiled per $TP_7$ where tile 1004 is the north position of $TP_7$ and has one access point.

Portion 1039 is tiled per $TP_{12}$ where: (a) tile 1030 has one access point located in the south position of $TP_{12}$; (b) tile 1032 has one access point located in the east position of $TP_{12}$; and (c) tile 1034 has one access point located in the north position of $TP_{12}$.

Two access points are located in first interstitial portion 1019, one in each SAP 1010 and 1012. Tiling with pattern $TP_{13}$ was selected to avoid interference between facing sectors of juxtaposed SAPs. A suitable half of each SAP is disabled. In other words, SAP 1010 corresponds to $SAP_{11}$ for the north position of $TP_{13}$ with the north-west, south-west, and south sectors disabled. SAP 1012 corresponds to $SAP_{12}$ for the south position of $TP_{13}$ with the north, north-west, and south-west sectors disabled.

Four access points are located in second interstitial portion 1029, one in each SAP 1020-1026. Tiling with pattern $TP_{12}$ is continued from portion 1039 to avoid interference between facing sectors of juxtaposed SAPs. A suitable half of each SAP is disabled. In other words, SAP 1020 (and 1026) corresponds to $SAP_8$ for the east portion of $TP_{12}$ with the north-west, south-west, and south sectors disabled. SAP 1022 corresponds to $SAP_9$ for the north position of $TP_{12}$ with the north, north-west, and south-west sectors disabled. SAP 1024 corresponds to $SAP_7$ for the south position of $TP_{12}$ with the north-west, south-west, and south sectors disabled.

A method, according to various aspects of the present invention and performed by a prospective member platform, joins the prospective member platform to an existing network (e.g., begin accessing traffic for users of the prospective member platform or begin routing user traffic and/or network control traffic) or forms a new network where the prospective member platform is a member. Such a method conditionally creates an integrated network and provides the prospective member platform with routing information sufficient for it to route any user traffic and/or network control traffic. In one implementation such a method includes the processes discussed above with reference to process 500. For example, method 1100 of FIG. 11A-11E, joins a prospective member platform (PMP) to network 100 having one master access point (MAP) or creates a network 100 having itself as the one MAP.

All platforms other than the MAP are considered slaves. Slave platforms that are within range of the antenna unit of the PMP are considered neighbor slaves (NS). Communication is described as using a master/slave channel, a slave/slave channel, or a slave/user channel. Typically, the slave/user channel corresponds to the channel in a sector of an SAP of the network being joined. The master/slave channel (e.g., for network control traffic) and the slave/slave channel (e.g., for routing user traffic among slave platforms) may be channels of the network to be joined, may be well known channels of this or another network (e.g., a LAN coupling for communication the PMP and other access points), or may be designated in subsequently received network control traffic. As used herein the term servicing includes monitoring traffic, receiving traffic, performing or delegating operations that may be implied by the received traffic or desired to form a reply to the received traffic, and sending a suitable reply as may be directed by a conventional protocol.

To begin, the PMP (e.g., 200 or any type platform of network 100) uses a master/slave channel to broadcast a request (1102) for MAP response. The response may be received on the same master/slave channel or on any suitable channel. The broadcast serves to discover the MAP for the purpose of participating in network control traffic. If a MAP did not reply within a suitable period (1104), the PMP sets itself (1106) as the MAP for a new network, establishes its own antenna orientation (e.g., an angle measured from magnetic north, or a default value such as zero); establishes the tile pattern to be used in the new network (e.g., a user or factory defined TP), and establishes itself at a position in the TP (e.g., most northerly, or position one).

Thereafter, the PMP services requests for MAP response by transmitting a reply, preferably on the master/slave channel used for the request. Such requests originate from other prospective platforms performing method 1100 to join the new network.

The PMP establishes (1110) a registry for slave access point identification. Network control traffic includes requests by platforms desiring to be added to the registry. Identifications in the registry may be used in routing information created by the PMP. Such routing information may be distributed to other platforms of the network in conventional network control traffic. The PMP uses the routing information to develop a routing table for its own use.

The PMP services (1112) traffic on one or more master/slave channels that may exist in one or more sectors of its SAP. The PMP also services traffic on one or more slave/slave channels that may exist in one or more sectors of its SAP. Further, the PMP also services (1116) local user traffic in each sector on one or more slave/user channels. Processing is complete (1118) as to creating a network (1106-1110) and servicing continues until the network is terminated or otherwise disrupted.

If one or more MAPs did reply (1104), it is determined whether only one MAP replied (1120). If so, the PMP sets itself as a slave access point (1122); and performs the following operations in response to information received from the MAP in its reply or received in further network control traffic (e.g., as informed by a neighbor slave): (a) sets the tile pattern this PMP will use; and (b) sets the antenna orientation this PMP will use. These settings are typically used for all subsequent user/slave communication on the network. Dynamic reconfiguration of the TP, SAP, and orientation (e.g., at any convenient time) in accordance with received network control traffic may be followed (see 1136, 1160, 1162, 1166).

Following adoption of the TP, and antenna orientation, the PMP uses this information to guide selection of a suitable SAP, for example, by determining a suitable position in the adopted TP. To this end, the PMP uses each slave/slave channel in each sector to broadcast a request (1124) for a neighbor slave (NS) response. The request serves to discover any neighbor slaves. In other words, the PMP scans each sector to discover NSs that are within range.

If no NS replies (1126) within a suitable period, the PMP establishes that it will use a particular SAP (e.g., any suitable position of the TP, most northerly position, or the first position of the TP) for all further user/slave communication. Otherwise (1126), it is determined (1130) if all NSs that did reply are using the same TP as the adopted TP (1122); and, if so, it is further determined (1132) whether a compatible TP position is available. If the NSs that did reply are not using the same TP, processing proceeds (1102) as if more than one MAP should have replied (e.g., increasing the range used to discover MAPs, decreasing the range to assure only immediate neighbors reply, or increasing the period for expected MAP replies).

A compatible TP position is deemed available when the position as reported by an NS at a particular sector is consistent with the geometry and orientation of the adopted TP so that a suitable position is evident. For example if a south facing sector reports an NS using the south position of the TP, then the north position may be deemed available. If another NS reports that it is already using the position that the sector and geometry imply, then no compatible position is available. If no compatible TP position is available (1132), the PMP prepares itself to become the MAP of a new network. The new network may have SAPs based on shorter range channels, or use channels not used in the TP of the responding NSs (1130). Processing continues as discussed above for setting up a new network (1106).

After determining a suitable position (SAP) in the TP (1128 or 1134), the PMP begins service of slave communication (1138) in each sector on slave/slave channels. Simultaneously, service may be begun for local user communication in each sector on slave/user channels (1140). Processing continues as discussed above with reference to 1118.

If more than one MAP replied (1120), it is determined (1142) whether only two MAPs replied. If not (1144), master/slave communication is reset to use either a shorter communication range, a shorter time period for awaiting MAP replies, or both. Processing continues to repeat the request (1102) for MAP replies.

Otherwise, only two MAPs replied (1142); and, the PMP is apparently in an interstice between them. This conclusion may be confirmed by analysis of the directions from which the MAPs replied and any suitable exception processing conducted if unconfirmed. It is then determined whether an integral network is to be formed. A factory setting or prior network control traffic may be used to determine this result. If an integral network is not to be formed, the user may be prompted to designate the network to be joined by designating which MAP is to be followed (1166). Further processing proceeds (1122) as if only the designated MAP replied.

If an integral network is to be formed, then the TP and orientation of each MAP is used in turn to discover NSs. First, the TP and antenna orientation of the first MAP is set (1148) for communication in the network managed by the first MAP. Each suitable slave/slave channel is used to broadcast (1150) requests for NS response in each sector as discussed above with reference to 1124. The directions associated with replies from NSs are logged. Additional information such as the SAP used by each NS that replied may also be logged. Second, the TP and antenna orientation of the second MAP is set (1152) for communication in the network managed by the second MAP. Then, each suitable slave/slave channel is used to broadcast (1154) requests for NS response in each sector as discussed above with reference to 1124. The directions associated with replies from NSs are logged. Additional information such as the SAP used by each NS that replied may also be logged. After logging information from both networks, it is determined (1156) whether a compatible interstitial SAP is available. A suitable interstitial SAP may be determined as discussed above with reference to method 800.

If so, the PMP sets (1158) its antenna orientation, TP, and position in the TP according to the available interstitial SAP. To integrate the networks, the PMP may initiate (1160) resignation of the second MAP in favor of the first MAP. Initiation may include transmitting network control traffic to one or both MAPs. Resignation may be implemented via network control traffic between the MAPs routed through the PMP. Processing continues (1138) under the first MAP.

If a compatible interstitial SAP is not available (1156), the PMP may initiate (1162) action by the second MAP to adopt and implement a different tile pattern. The different tile pattern may be more suitable for tiling the interstice where the PMP is located. The PMP may send by network control traffic sufficient information and a request for the MAP to determine the different TP. Otherwise, the PMP may make the determination and send a request to the MAP that includes indicia of a suggested different TP to be adopted. The TP to be adopted may be consistent with method 800, discussed above. The different TP may employ a different range and/or a different geometry (e.g., geometries of FIG. 7 replacing geometries of FIG. 6). After initiating such action, the PMP awaits (1164) implementation of the different TP by the second MAP and then proceeds with the TP and antenna orientation received (1102) from the second MAP (1152).

Figure 12A:
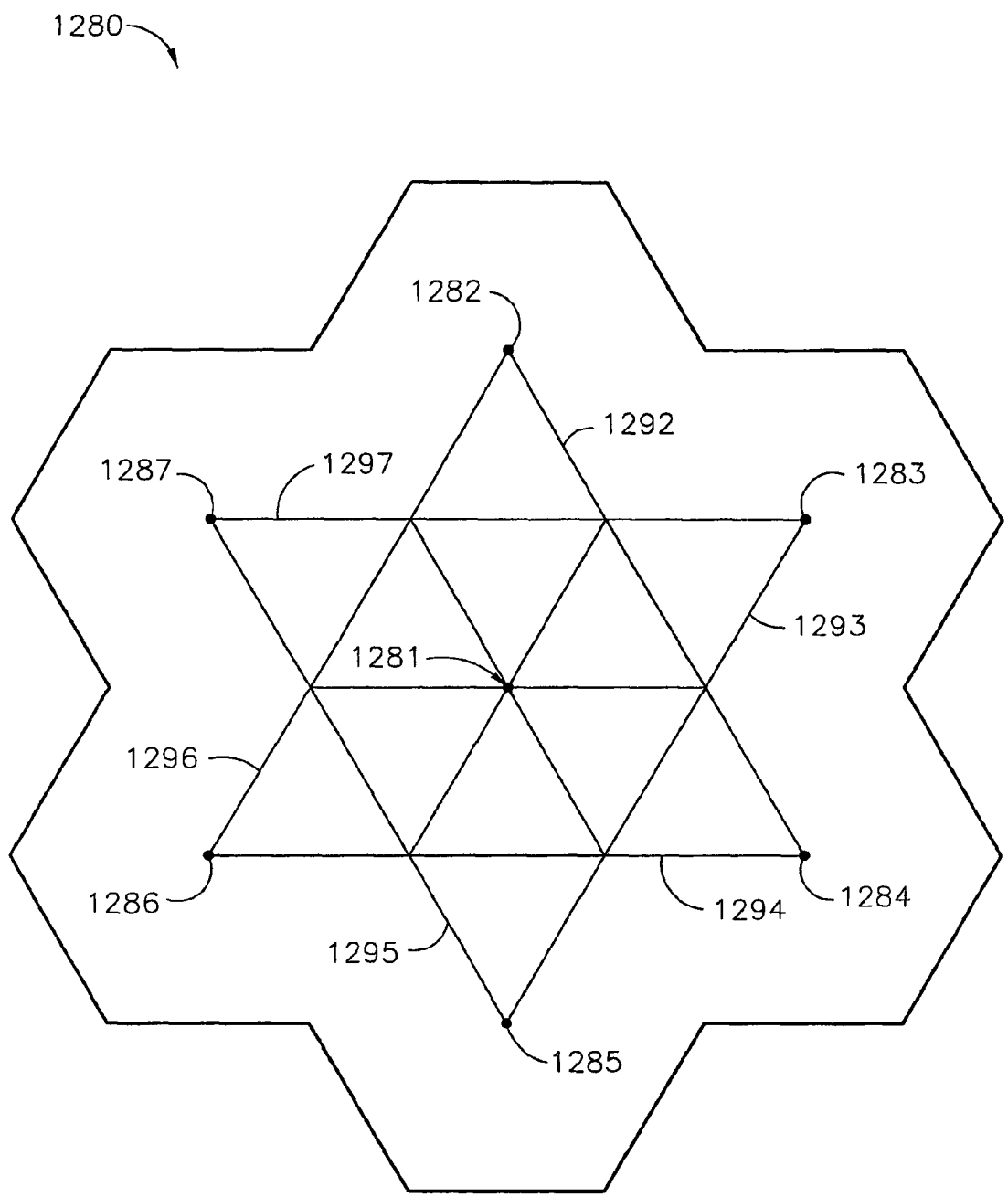
FIG. 12A is a diagram of a central platform of FIG. 1 surrounded by neighbor platforms.
Figure 12B:
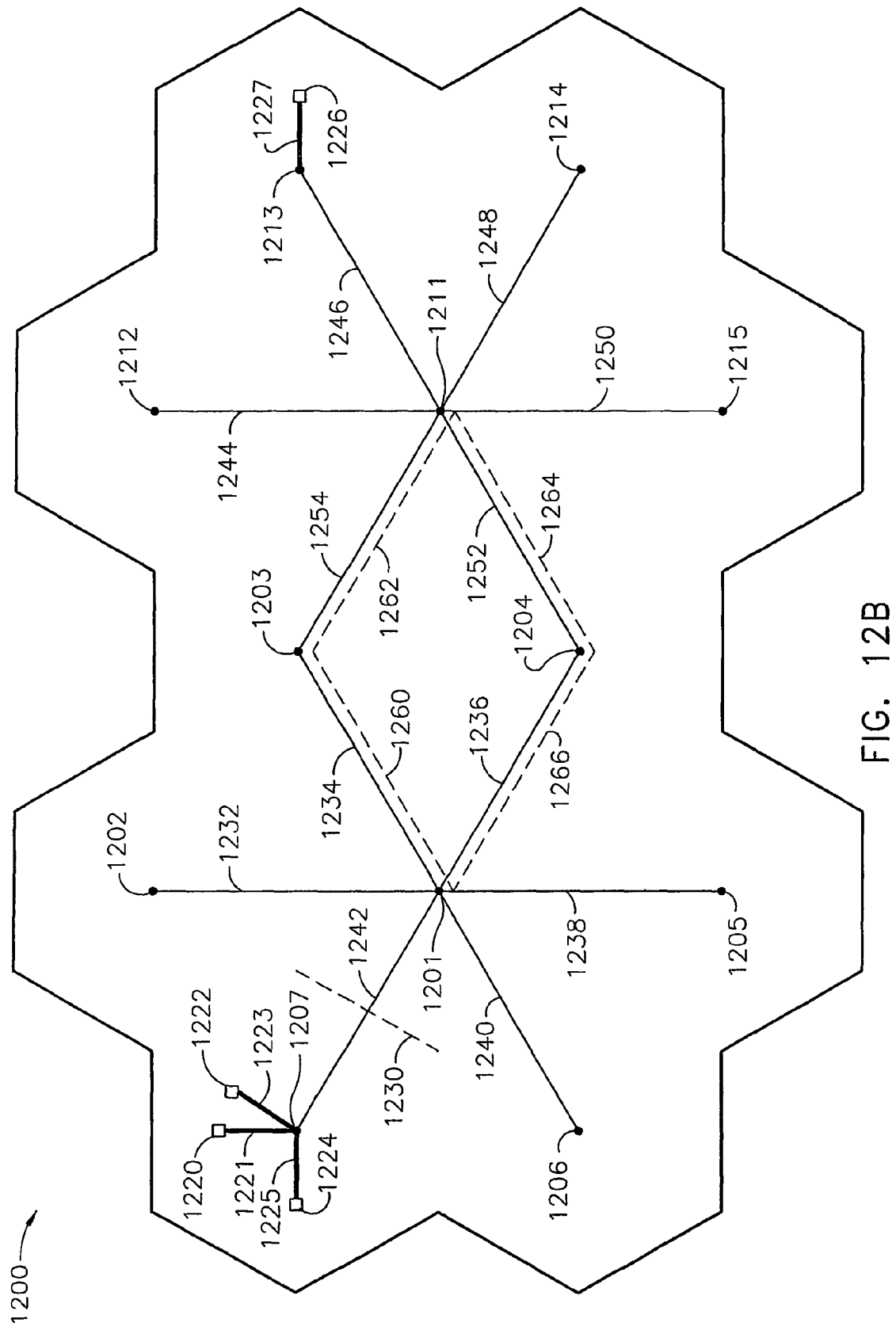
FIG. 12B is a diagram of overlapping tile patterns according to various aspects of the present invention.

According to various aspects of the present invention, a centrally located platform (e.g., a SOMA or concentrator access point) may communicate with neighboring platforms using slave/slave communication channels not part of the SAPs of the neighboring platforms used for slave/user traffic. The centrally located platform may provide its own SAP for slave/user traffic local to the centrally located platform. The SAPs for slave/user traffic may conform to any TP. For example, a portion of a region 1280 includes a centrally located platform 1281 (e.g., SIDA, SOMA, or PAU), and six neighboring platforms 1282-1287. SAPs for slave/user traffic for each platform 1281-1287 conform to any suitable TP of FIG. 7B (using channels A, B, and C) so that facing sectors use different channels and do not communicate. Slave/slave communication is accomplished using channels D and E arranged in sectors as shown in FIG. 12A. Here, facing sectors use the same channel to facilitate slave/slave communication. Specifically, sector 1292 of platform 1282 communicates on channel D with platform 1281 by virtue of facing sectors; sector 1293 of platform 1283 communicates on channel E with platform 1281 by virtue of facing sectors; sector 1294 of platform 1284 communicates on channel D with platform 1281 by virtue of facing sectors; sector 1295 of platform 1285 communicates on channel E with platform 1281 by virtue of facing sectors; sector 1296 of platform 1286 communicates on channel D with platform 1281 by virtue of facing sectors; and sector 1297 of platform 1287 communicates on channel E with platform 1281 by virtue of facing sectors. In one implementation, slave/user channels (A, B, and C) conform to IEEE 802.11B ethernet and slave/slave channels (D and E) conform to IEEE 802.11A ethernet.

Three wireless networks may be employed for routing user traffic and network control traffic according to various aspects of the present invention. For example, region 1200 of FIG. 12B includes two overlapping regions of the type discussed above with reference to FIG. 12A. The first such region is centered at central platform 1201 and the second at central platform 1211. As a first network, each central platform communicates with the other via a first path (links 1260 and 1262) and a second path (links 1264 and 1266). These paths pass through platforms 1203 and 1204 respectively. As a second network, each central platform communicates with its neighbor slave platforms via radially disposed links: 1232-1242 from platform 1201 to NSs 1202-1207; and 1244-1254 from platform 1211 to NSs 1212-1215, 1204 and 1203 respectively. Each platform may service slave/user traffic on channels allocated in a suitable SAP so that users in one sector do not interfere with users in another sector.

A link from a platform to a user may be implemented by wiring to an interface as discussed above. Alternately, a user may include an antenna for a wireless communication link on a channel for the sector of the SAP where the user is located. The antenna may be omnidirectional or directed toward the access point. Conventional handoff techniques may be used to support uninterrupted user links when the user moves from one sector to another of the same or a different platform.

For example, user 1221 communicates with platform 1207 via a link 1225 on a channel different from the channels used in adjacent sectors that serve other users. Other users may include user 1220 on link 1221 and user 1222 on link 1223 to platform 1207. These two other users may use the same channel but differentiate messages by unique addresses, time slots, or other features of conventional protocols. If any user 1220-1222 desires to communicate to user 1226 served on link 1227 by platform 1213, such communication would constitute user/user communication and be serviced on slave/user channels (e.g., 1221, 1223, 1225, and 1227) and slave/slave channels (1232-1242, 1244-1254, and others not shown (e.g., from 1207 to 1202)). By virtue of concentration, some links may be serviced at higher bandwidth than others. For example, links 1260-1266 may offer higher bandwidth and therefore be preferred. Routing tables maintained in each platform may direct any number of packets on any available path. Routing between concentrator platforms may be indicated in routing information or routing tables for preferred routing.

Figure 13A:
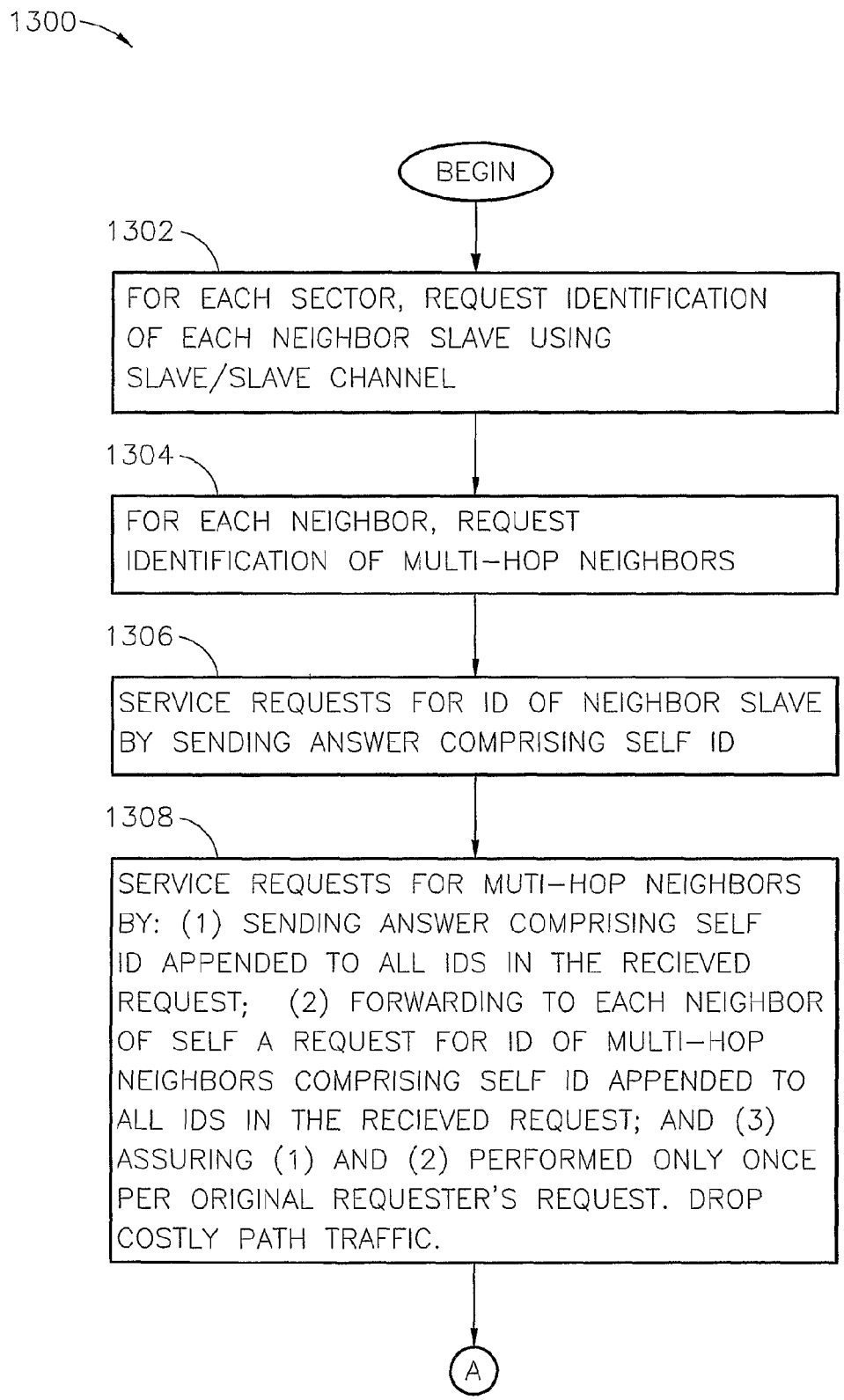
FIGS. 13A-13B present a process flow diagram of a method for updating a routing table according to various aspects of the present invention.
Figure 13B:
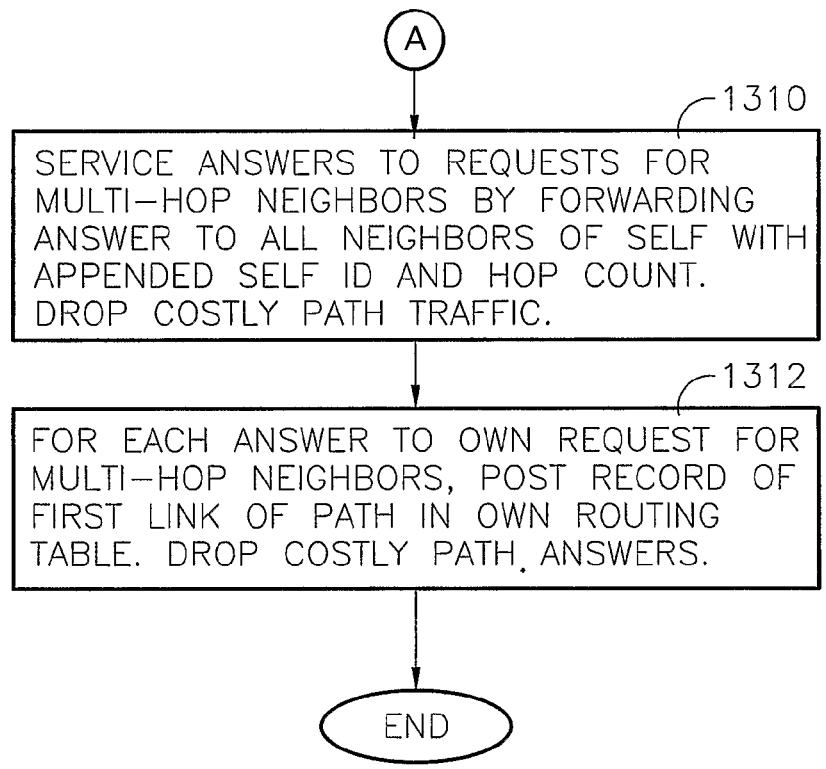

A method, according to various aspects of the present invention, for determining routing tables for any wireless network (or combination of wireless networks) discussed above may include flooding of the network with requests for path discovery and analysis of answers to such requests. For example, method 1300 of FIGS. 13A-13B, is performed by any platform (e.g., per process 516) as initiated at any suitable time (e.g., per 1110). The platform performing the method begins by requesting (for each sector) identification (1302) of each neighbor slave (NS) using a slave/slave channel. For each NS responding to the first request (1302), the platform further requests (1304) identification of multi-hop neighbors. The platform may service (1306) requests originating on other platforms similar to the first request (1302) by sending an answer comprising its self identification.

The platform may service (1308) requests for multi-hop neighbors similar to the second request (1304) that originated from other platforms. This type of servicing may include: (1) sending an answer comprising its self identification appended to all identifications of platforms received in the request; (2) forwarding to each neighbor of itself a request for identification of multi-hop neighbors comprising its self identification appended to all identifications of platforms received in the request; and (3) assuring that actions (1) and (2) are performed only once per original requester's request. Such assurance may be accomplished by analyzing each request for a unique origination indicator and keeping track of answered requests by origination indicator. The origination indicator may include platform identification and calendar date and time. While servicing such requests (1308), traffic associated with a costly path is dropped.

A path may be described or identified by a list of links between platforms coupling the source to the destination. Each link corresponds to a hop. A path length may be described as a hop count, the number of hops along the path. A part of a path is called a way. A path may be considered costly when it includes a way from a sender wherein the way has more than one link between nodes which have the same hop count from the sender. In geometries of FIGS. 6 and 7 such a path would begin to traverse an arc about the sender. A path may be considered costly when it includes a first way to a node that is reachable by an alternate way—the hop counts of the first way and the alternate way being different by more than three. On the other hand, if the difference is but two or three hops, the alternate path may be useful in avoiding a bottleneck on the first way. A path may be considered costly when it includes a way from a sender that returns to the sender. A path may be considered costly when it has a hop count above a maximum hop count. A path may be considered costly when cumulative predicted delay for a way of the path exceeds a maximum delay.

The platform may service (1310) answers to requests for multi-hop neighbors by forwarding an answer to all neighbors of the platform. Such an answer may include self identification of the platform and hop count. Costly path traffic may be dropped.

For each answer to the platform's own request for multi-hop neighbors (1304), the platform may post (1312) in a record in its own routing table indicia of the first link of the discovered path (e.g., the destination from the platform of the last hop of the answer's path). Costly path answers may be dropped. The routing table so prepared may be updated by repeating method 1300 at any time. Portions of the routing table may be sent to any neighbor slave platform to avoid or limit actions by the neighbor to update its own routing information.

In a system providing a network based on IEEE 802.11B, mutual system interference may restrict the number of possible channels to three channels: channel 1, channel 6 and channel 11 operated simultaneously. Spatial allocation patterns using three channels (e.g., three alternatives for frequency diversity) include rectangular spatial allocation patterns (or square patterns) as in FIG. 6A and hexagonal spatial allocation patterns as in FIG. 7A. Several alternate network configurations use IEEE 802.11B transceivers in each subscriber platform.

For a hexagonal spatial allocation pattern the antenna system that is part of the subscriber platform provides from 3 dB to 6 dB of difference between the center of the sector and a point 30 degrees on each side of the center. The antenna provides from 15 dB to 20 dB of signal rejection from signals located directly behind the antenna. Such an antenna system provides a radiation pattern in each of 6 sectors, where each sector is 60 degrees of a 360 degree circle. Although three channels are used in various spatial allocation patterns, tile patterns as described in FIGS. 6B and 7B utilize three designated channels.

The SAPs described in FIG. 6A can be combined in any random order where no two adjacent antennas have the same frequency/channel assignment. These SAPs may be used singularly or in any combination to form a network in which no antennas facing each other have the same frequency/channel assignment. For a network having 16 subscriber platforms arranged in a square using four of the tile patterns of FIG. 6B, there are a total of 1,296 (that is $6^4$) possible combinations of the six SAPs. A preferred antenna system provides about 20 dB of signal rejection from any signal source more than 90 degrees from the center of the antenna sector.

Close packed hexagonal cells may be arranged for implementing a dense network. Each cell consists of one subscriber platform. The center to center distance between subscriber platforms may be 25 feet. An arrangement of 22 cells may span a substantially square area measuring 125 feet per side. If the network was constructed using IEEE 802.11B transceivers for each sector, each platform would have more than 50 Mbps of bandwidth and the network of 22 platforms would have a total throughput of greater than 1.1 Gbps.

By contrast, conventional IEEE 802.11B compatible networks are limited to 11 Mpbs per user. A conventional wireless access point network where access points are connected with a local area network provides about a 100 foot separation between access points. Such a network would be limited to three or four access points; and, limited to a total capacity of from 33 Mbps to 44 Mbps.

If the system described above were constructed using IEEE 802.11A transceivers and 6 transceivers per subscriber platform, each platform would have more than 300 Mbps throughput. In such a network, each sector of a subscriber platform would provide approximately 54 Mbps of system throughput. Individual users may be limited to 11 Mbps in accordance with the standard IEEE 802.11A protocol. The network may have a total system capacity greater than 6.6 Gbps.

The system of 22 subscriber platforms arranged as described above, may be hard wired to a central network, each subscriber platform being connected to the central local area network on a wired connection. The infrastructure cost associated with the local area network wiring would be significant. In contrast, two networks implemented in accordance with various aspects of the present invention may be used to reduce or eliminate the infrastructure cost associated with wired connections.

In a first example of a network according to various aspects of the present invention, data transfer among the cells of the 22 cell network described above may be implemented by designating four of the 22 cells as concentrator cells. All cells of the 22 cell network may use IEEE 802.11B wireless links, six links per subscriber platform. In addition, each subscriber platform may have one IEEE 802.11A link to the nearest concentrator cell. Such an IEEE 802.11A link may be implemented using the same antenna system or an additional antenna system. The concentrator cell uses IEEE 802.11B transceivers to support six sectors for data transfer to and from users. The concentrator cell uses six IEEE 802.11A links to collect data from adjacent cells. The concentrator cells may communicate via a local area network among concentrator cells. The local area network may include a wired connection to each of the concentrator cells. Consequently, the infrastructure required to support data transfer to and from any sector with any other sector can be provided with four wired local area network connections as opposed to 22 wired connections as discussed above. Each linlc of the IEEE 802.11A network has a throughput of 54 Mbps. Each sector of a concentrator cell may be used to collect data up to a bandwidth of 54 Mbps from adjacent cells. As a result, the concentrator cell provides bandwidth for supporting its own sectors at IEEE 802.11B and up to six adjacent cell sectors for a total of 378 Mbps of system throughput. Note that sectors that face each other for the IEEE 802.11B network have frequency diversity to avoid interference; however, facing sectors of the IEEE 802.11A network have a common frequency channel assignment for intended communication.

A second example network includes in each subscriber platform six IEEE 802.11B network links to support user traffic and six IEEE 802.11A links for network traffic. Facing sectors using IEEE 802.11B protocol would use frequency diversity to remain independent. Facing sectors using IEEE 802.11A protocol would use common frequency/channel assignments for intended communication. In the 22 cell system described above, 49 independent wireless connections using IEEE 802.11A exist between opposing sectors on adjacent cells. The 49 independent connections provide a total bandwidth of 2,646 Mbps as opposed to the 1,453 Mbps that the IEEE 802.11B links are capable of providing. The performance of the system may be reduced if data servers are not located optimally. When a single data server is attached to only one cell subscriber platform, access to the data on such a server is limited to about 3 to 4 Mbps (e.g., a single IEEE 802.11A cell bandwidth). If the server is attached to multiple subscriber platforms, or preferably multiple identical servers are attached to widely placed subscriber platforms, the capacity of the system will increase dramatically. In an optimum configuration, nine server connection points are used; or, substantially all cell to cell communication is supported with multiple IEEE 802.11A links.

The network of this second example may be used to completely eliminate the need for wired connections to a local area network. In this second example, a potential bandwidth of 2.6 Gbps is provided. In contrast, a conventional wired network could provide about 1 Gbps of system bandwidth.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method performed by a platform with respect to a neighbor platform, to join an existing multiple channel communication network of platforms that includes the neighbor platform, the platform and each platform of the network being capable of conveying user traffic via two or more channels, each channel respectively comprising a signaling technology and a direction, the method comprising:
  determining an identity of a tile an instance of which is in use by the neighbor platform, wherein
    a. the tile comprises a group of sets of channels, each set comprises a unique spatial position relative to the other sets of the group, each channel of a particular set has a direction away from a respective center of the set; and
    b. the neighbor platform is configured to communicate via a first plurality of channels in accordance with a first set of the group whereby the tile is in use by the neighbor platform and the first set is in use by the neighbor platform;
  determining an identity of a second set of the group that is not in use; and
  configuring the platform to communicate user traffic via a second plurality of channels in accordance with the second set of the group, wherein the user traffic originates or terminates with any one or more users served by the platform, the neighbor platform, or any platform of the network, whereby the tile is in use by the platform and the second set is in use by the platform.

2. The method of claim 1 wherein determining the identity of the tile comprises receiving network control traffic.

3. The method of claim 2 wherein the network control traffic is conveyed by the neighbor platform to the platform.

4. The method of claim 2 wherein the network control traffic is originated by the neighbor platform.

5. The method of claim 2 wherein the network control traffic is originated by a platform of the network in response to a request transmitted by the platform.

6. The method of claim 1 wherein determining the identity of the tile comprises identifying a signaling technology and a direction of a free channel.

7. The method of claim 1 wherein determining the identity of the tile comprises recalling a description of a tile from memory of the platform.

8. The method of claim 1 wherein determining the identity of the tile comprises determining a magnetic compass bearing.

9. The method of claim 1 wherein determining that a second set is not in use comprises receiving network control traffic.

10. The method of claim 9 wherein the network control traffic is conveyed by the neighbor platform to the platform.

11. The method of claim 9 wherein the network control traffic is originated by the neighbor platform.

12. The method of claim 9 wherein the network control traffic is originated by a platform of the network in response to a request transmitted by the platform.

13. The method of claim 1 wherein communication via a particular channel of the second set comprises receiving user traffic that originated within a sector of the tile.

14. The method of claim 1 wherein communication via a particular channel of the second set comprises conveying user traffic on a path through a sector of the tile.

15. A non-transitory processor-readable store comprising instructions that when executed by a processor of a platform cause the platform to perform a method with respect to a neighbor platform, to join an existing multiple channel communication network of platforms that includes the neighbor platform, the platform and each platform of the network being capable of conveying user traffic via two or more channels, each channel respectively comprising a signaling technology and a direction, the method comprising:
- determining an identity of a tile an instance of which is in use by the neighbor platform, wherein
  - a. the tile comprises a group of sets of channels, each set comprises a unique spatial position relative to the other sets of the group, each channel of a particular set has a direction away from a respective center of the set; and
  - b. the neighbor platform is configured to communicate via a first plurality of channels in accordance with a first set of the group whereby the tile is in use by the neighbor platform and the first set is in use by the neighbor platform;
- determining an identity of a second set of the group that is not in use; and
- configuring the platform to communicate user traffic via a second plurality of channels in accordance with the second set of the group, wherein the user traffic originates or terminates with any one or more users served by the platform, the neighbor platform, or any platform of the network, whereby the first tile is in use by the platform and the second set is in use by the platform.

* * * * *